United States Patent
Del Negro et al.

(10) Patent No.: US 12,433,965 B2
(45) Date of Patent: Oct. 7, 2025

(54) METHODS AND SYSTEMS FOR ADVANCED DISINFECTION AND DECONTAMINATION

(71) Applicant: AGIS Holdings, LLC, Broomfield, CO (US)

(72) Inventors: Andrew S. Del Negro, Broomfield, CO (US); Gary A. Bland, Broomfield, CO (US)

(73) Assignee: AGIS HOLDINGS, LLC, Broomfield, CO (US)

( * ) Notice: Subject to any disclaimer, the term of this patent is extended or adjusted under 35 U.S.C. 154(b) by 1089 days.

(21) Appl. No.: 17/327,366

(22) Filed: May 21, 2021

(65) Prior Publication Data

US 2022/0008586 A1 Jan. 13, 2022

Related U.S. Application Data

(60) Provisional application No. 63/029,096, filed on May 22, 2020.

(51) Int. Cl.
*A61L 2/22* (2006.01)

(52) U.S. Cl.
CPC ............ *A61L 2/22* (2013.01); *A61L 2202/11* (2013.01); *A61L 2202/15* (2013.01); *A61L 2202/16* (2013.01)

(58) Field of Classification Search
CPC .... A61L 2/22; A61L 2202/11; A61L 2202/15; A61L 2202/16
See application file for complete search history.

(56) References Cited

U.S. PATENT DOCUMENTS

| | | |
|---|---|---|
| 5,567,444 A | 10/1996 | Hei et al. |
| 5,904,901 A | 5/1999 | Shimono et al. |
| 6,969,487 B1 | 11/2005 | Sias et al. |
| 6,982,006 B1 | 1/2006 | Boyers et al. |
| 7,008,592 B2 | 3/2006 | Sias et al. |
| 7,967,800 B2 | 6/2011 | Chewins et al. |
| 8,716,339 B2 * | 5/2014 | Larson .................. A01N 31/02 424/618 |
| 2007/0199581 A1 | 8/2007 | Lynn et al. |
| 2009/0071331 A1 | 3/2009 | Gillette |
| 2010/0176066 A1 | 7/2010 | Budde et al. |

FOREIGN PATENT DOCUMENTS

| | | |
|---|---|---|
| EP | 2025740 | 2/2009 |
| WO | WO 03/028773 | 4/2003 |
| WO | WO 11/085466 | 7/2011 |

(Continued)

OTHER PUBLICATIONS

Ahn et al., "Disinfection of Ballast Water with Iron Activated Persulfate," *Environmental Science & Technology*, vol. 47, 2013, pp. 11717-11725.

(Continued)

*Primary Examiner* — Sean E Conley
(74) *Attorney, Agent, or Firm* — Messner Reeves LLP

(57) ABSTRACT

Embodiments described herein relate to methods and systems for the simultaneous decontamination and disinfection of surface and airborne contaminants. In particular, catalytically boosting the performance of a class of oxidizing biocides for improved antimicrobial performance and shorter contact times is disclosed.

16 Claims, 12 Drawing Sheets

(56) References Cited

FOREIGN PATENT DOCUMENTS

| WO | WO 12/153303 | 11/2012 |
|---|---|---|
| WO | WO 19/102387 | 5/2019 |

OTHER PUBLICATIONS

Amr et al., "Optimization of stabilized leachate treatment using ozone/perfulfate in the advanced oxidation process," *Waste Management*, vol. 33, 2013, pp. 1434-1441.

Barry et al., "Promoting Hydroxyl Radical Production during Ozonation of Municipal Wastewater," *Ozone: Science & Engineering: The Journal of the International Ozone Association*, vol. 36:3, 2014, pp. 229-237.

Cai et al., "UV/Peracetic Acid for Degradation of Pharmaceuticals and Reactive Species Evaluation," *Environmental Science & Technology*, 2017, 27 pages.

Cho et al., "Disinfection of Water Containing Natural Organic Matter by Using Ozone-Initiated Radical Reactions," *Applied and Environmental Microbiology*, vol. 69, No. 4, 2003, pp. 2284-2291.

Cirlini et al., "Stability Studies of Ozonized Sunflower Oil and Enriched Cosmetics with a Dedicated Peroxide Value Determination," *Ozone: Science & Engineering: The Journal of the International Ozone Association*, vol. 34:4, 2012, 8 pages.

Dittoe et al., The Addition of Viriditec™ Aqueous Ozone to Peracetic Acid as an Antimicrobial Spray Increases Air Quality While Maintaining *Salmonella typhimurium*, Non-pathogenic *Escherichia coli*, and *Campylobacter jejuni* Reduction on Whole Carcasses, *Frontiers in Microbiology*, vol. 9, Article 3180, 2019, pp. 1-8.

El-Zomrawy, "Kinetic studies of photoelectrocatalytic degradation of Ponceau 6R dye with ammonium persulfate," *Journal of Saudi Chemical Society*, vol. 17, 2013, pp. 397-402.

Fischbacher et al., "The OH Radical Yield in the $H_2O_2+O_3$ (Peroxone) Reaction," *Environmental Science & Technology*, 2013, pp. A-F.

Fisk et al., "Ozone removal by filters containing activated carbon: a pilot study," *Environmental Energy Technologies Division*, 2009, 7 pages.

Ghanbari et al., "Application of peroxymonosulfate and its activation methods for degradation of environmental organic pollutants," *Chemical Engineering Journal*, 2016, 73 pages.

He et al., "Destruction of cyanobacterial toxin cylindrospermopsin by hydroxyl radicals and sulfate radicals using UV-254 nm activation of hydrogen peroxide, persulfate and peroxymonosulfate," *Journal of Photochemistry and Photobiology A: Chemistry*, vol. 251, 2013, pp. 160-166.

Hirneisen et al., "Ozone Inactivation of Norovirus Surrogates on Fresh Produce," *Journal of Food Protection*, vol. 74, No. 5, 2011, pp. 836-839.

Hu et al., "Cobalt-catalyzed sulfate radical-based advanced oxidation: A review on heterogeneous catalysts and applications," *Applied Catalysis B: Environmental*, vol. 181, 2016, pp. 103-117.

Huang et al., "UVA-UVB activation of hydrogen peroxide and persulfate for Advanced Oxidation Processes: Efficiency, mechanism and effect of various water constituents," *Journal of Hazardous Materials*, 2018, 35 pages.

Ibanez-Cervantes et al., "Effect of Ozone and Peroxone on Helminth Hymenolepis nana Eggs," *Ozone: Science & Engineering*, vol. 35, 2013, pp. 201-207.

Jiang et al., "Cold plasma-activated hydrogen peroxide aerosol inactivates *Escherichia coli* O157:H7, *Salmonella typhimurium*, and *Listeria innocua* and maintains quality of grape tomato, spinach and cantaloupe," *International Journal of Food Microbiology*, vol. 249, 2017, pp. 53-60.

Lee et al., "Evaluation of Activated Carbon Filters for Removal of Ozone at the PPB Level," *American Industrial Hygiene Association Journal*, vol. 60, 1999, pp. 589-600.

Merenyi et al., "Reaction of Ozone with Hydrogen Peroxide (Peroxone Process): A Revision of Current Mechanistic Concepts Based on Thermokinetic and Quantum-Chemical Considerations," *Environ Sc. Technol.*, vol. 44, 2010, pp. 3505-3507.

Rodrigues de Almeida Kogawa et al., "Synthesis, characterization, thermal behavior, and biological activity of ozonides from vegetable oils," *Royal Society of Chemistry*, 2012, 14 pages.

Selvakumar et al., "Use of Fenton's Reagent as a Disinfectant," *Remediation*, 2009, pp. 135-142.

Sharma et al., "Ozone gas is an effective and practical antibacterial agent," *Association for Professionals in Infection Control and Epidemiology, Inc.*, 2008, pp. 559-563.

Sun et al., "Inactivation of *E. coli*, Bacteriophage MS2 and Bacillus Spores under UV/H202 and UV/Peroxydisulfate Advanced Disinfection Conditions," *Environmental Science & Technology*, 2016, 39 pages.

Tulay et al., "Effects of pH, Initiator, Scavenger, and Surfactant on the Ozonation Mechanism of an Azo Dye (Acid Red-151) in a Batch Reactor," *Chem. Eng. Comm.*, vol. 196, 2009, pp. 39-55.

Wu et al., "Reactive radical-driven bacterial inactivation by hydrogen-peroxide-enhanced plasma-activated-water," *Eur. Phys. J. Special Topics*, vol. 226, 2017, pp. 2887-2899.

Yang et al., "Production of Sulfate Radical and Hydroxyl Radical by Reaction of Ozone with Peroxymonosulfate: A Novel Advanced Oxidation Process," *Environmental Science & Technology*, 2015, 27 pages.

Zhou et al., "Activated carbon fibers as an effective metal-free catalyst for peracetic acid activation: Implications for the removal of organic pollutants," *Chemical Engineering Journal*, 2015, 37 pages.

Zoutman et al., "Effectiveness of a novel ozone-based system for the rapid high-level disinfection of health care spaces and surfaces," *Association for Professionals in Infection Control and Epidemiology, Inc.*, 2011, pp. 873-879.

\* cited by examiner

METHODS AND SYSTEMS FOR ADVANCED DISINFECTION AND DECONTAMINATION

CROSS-REFERENCE TO RELATED APPLICATION(S)

This application is a non-provisional of and claims the benefit under 35 U.S.C. 119(e) of U.S. Provisional Patent Application No. 63/029,096 filed on May 22, 2020, the contents of which are incorporated herein by reference as if fully disclosed herein.

FIELD

The described embodiments relate generally to methods and systems for decontaminating and disinfecting surfaces or airspaces of pathogens and refractory contaminants. More particularly, the present embodiments relate to activating short-lived, highly oxidizing mixtures at or near a surface to be treated. The activated mixtures are also used to treat contaminated air by oxidizing contaminated air that is cycled through an airspace recirculating system.

BACKGROUND

Most surface disinfectants or decontamination agents are limited by either poor performance against challenging pathogens (or refractory contaminants) or are harsh chemicals that are toxic to the user and hazardous in the environment. The highest performing disinfectants (decontamination agents) are utilized at relatively high active concentrations in order to achieve sufficient pathogen kill performance (or effective destruction of refractory contaminants). The use of these toxic chemicals requires specified use concentrations along with specified contact time in order to achieve the intended antimicrobial effect. Oftentimes, the handling and use of these chemicals present hazards to the user, the environment and can cause damage to the materials being disinfected (or decontaminated).

Oxidizing disinfectants are a safer class of biocides. Oxidizing biocides work by non-specific oxidation of chemical bonds, causing destruction of critical cell components. While oxidizing biocides possess certain safety and environmental advantages compared to alternatives, they require relatively high use concentrations and long contact times to achieve required log-kill performance against some challenging pathogens. The combination of high concentration oxidizers with longer required contact times may lead to surface material damage, particularly when used on delicate surfaces. Furthermore, oxidizing biocides are effective only when in contact with contaminants found on the surface to be cleaned. The use of oxidizing biocides for airborne disinfection, in the form of a fog or vapor, requires special use conditions as there are strict safe-exposure limits for airborne oxidizers. The inability of surface disinfectants to simultaneously decontaminate surfaces and airspace can lead to the reemergence and reinfection of pathogens in the space after it has been disinfected. There is a need for a method to boost the log-kill antimicrobial performance of oxidizing biocides, enabling their use at lower use-concentration for shorter contact times.

There is a need to provide combined surface and air decontamination methods that are effective against challenging contaminants, safe for users and room occupants, gentle on common surfaces and materials, and allow for shorter room re-entry times.

SUMMARY

The invention disclosed herein involves methods and systems for catalytically boosting the performance of a class of oxidizing biocides for improved antimicrobial performance and shorter contact times. The invention further discloses methods and systems for the simultaneous decontamination and disinfection of surface and airborne contaminants. Lastly, the invention describes methods and systems of disinfection wherein airborne residual oxidizer is continually neutralized and removed from the airspace during the disinfection step.

An embodiment described herein takes the form of a method for decontaminating a surface, including: providing an aqueous-based oxidizer solution; activating the aqueous-based oxidizer solution with an activator comprising at least one of a catalyst or UV photons near the surface to be decontaminated; and applying the activated aqueous-based oxidizer solution to the surface to be decontaminated.

The activating may include: providing a stream of the aqueous-based oxidizer solution; providing the activator comprising a stream of ozone containing gas, wherein the stream of ozone containing gas mixes with the stream of the aqueous-based oxidizer solution in an air atomized mixed sprayer nozzle to form an activated aqueous-based oxidizer solution; and the applying comprises spraying the activated aqueous-based oxidizer solution on the surface to be decontaminated with the air atomized mixed sprayer nozzle. Spraying the activated aqueous-based oxidizer solution with the air atomized mixed sprayer nozzle generates an activated aqueous-based oxidizer solution atomized spray.

The activated aqueous-based oxidizer solution may comprise: a peroxyacid mixture comprising at least one of a persulfate, a peroxycarboxylic acid, or a hydrogen peroxide; a concentration of the peroxyacid mixture in the activated aqueous-based oxidizer solution atomized spray is between 0.001 and 2 weight percent; and a ratio of the peroxyacid mixture to ozone molar equivalents is less than 250:1 in the combined atomized spray. A droplet size of the activated aqueous-based oxidizer solution atomized spray may be between 20-150 microns. The air atomized mixed sprayer nozzle may include a siphoning air atomized mixed sprayer nozzle. The stream of ozone containing gas may be produced by flowing dry air or oxygen through a corona discharge tube or between one or more corona discharge plates. The aqueous-based oxidizer solution may include: a peroxycarboxylic acid mixture; and a ratio of a volume of ozone-containing gas to a volume of the peroxycarboxylic acid mixture is between 500:1 and 0.1:1. The activator may include: a liquid solution comprising at least one or more of $Fe^{2+}$, $Mn^{2+}$, $Co^{2+}$, $Ag^{1+}$, $Ce^{2+}$, $Ni^{2+}$, or $V^{3+}$; or a liquid suspension containing insoluble suspended materials containing transition metals.

In embodiments, the activating may include: providing an atomized spray of the peroxycarboxylic acid mixture; providing a flux of UV photons at a wavelength between 200-420 nm and at sufficient intensity to completely decompose the peroxycarboxylic acid mixture; wherein the atomized spray of the peroxycarboxylic acid mixture is irradiated with the flux of UV photons to form an activated peroxycarboxylic acid mixture.

Another embodiment described herein takes the form of a method for decontaminating a surface, including: forming a peroxyacid-based biocide, the peroxyacid-based biocide comprising: an aqueous peroxyacid mixture stream comprising at least one component of a persulfate, a peroxycarboxylic acid, or a hydrogen peroxide; and a peroxyacid activator component; wherein the peroxyacid-based biocide is formed by mixing the aqueous peroxyacid mixture stream with the peroxyacid activator component in a sprayer nozzle; and applying a stream of the peroxyacid-based biocide to the surface to be decontaminated with the sprayer nozzle. A peroxyacid activator component may include: a liquid mixture of at least one soluble transition metal ion, comprising at least one of $Fe2+$, $Mn2+$, $Co2+$, $Ag1+$, $Ce2+$, $Ni2+$, or $V3+$; or a liquid suspension comprising at least one insoluble suspended material containing one or more transition metals.

In embodiments, a stoichiometric molar ratio of the aqueous peroxyacid mixture to the peroxyacid activator component in the peroxyacid-based biocide stream may be less than 250:1. A sprayer nozzle may be an air atomization sprayer nozzle.

In embodiments, each of a peroxyacid activator component and an aqueous peroxyacid mixture stream may be provided simultaneously by corresponding liquid pumps to the hydraulic air atomization sprayer nozzle to form the peroxyacid-based biocide. A supplied gas stream may atomize the peroxyacid-based biocide for applying an atomized peroxyacid-based biocide stream to the surface to be decontaminated. A droplet size of the atomized peroxyacid-based biocide stream may be between 20-150 microns.

In embodiments, an atomized peroxyacid-based biocide stream may generate a mixture of reactive oxygen species in the atomized peroxyacid-based biocide stream, and the atomized peroxyacid-based biocide stream that is applied to the surface to be decontaminated. The sprayer nozzle may be a hydraulic atomization sprayer nozzle. The aqueous peroxyacid mixture stream and the liquid mixture of the peroxyacid activator component may be each supplied to a hydraulic atomization sprayer nozzle by corresponding liquid pumps. A stream of the peroxyacid-based biocide may be atomized into an atomized peroxyacid-based biocide spray stream. An atomized peroxyacid-based biocide spray stream comprises a mixture of reactive oxygen species.

In embodiments, a method to decontaminate a surface includes neutralizing airborne contaminants and residual airborne atomized peroxyacid-based biocide with an air neutralization unit. The air neutralization unit includes: a blower to circulate an air mixture in a space to be decontaminated; and a destruct component that decomposes the airborne contaminants and the residual airborne atomized peroxyacid-based biocide contained in the air mixture passing through the air neutralization unit. A destruct component comprises at least one of: packed bed catalysts; catalyst functionalized materials; decomposition methods based on at least one of photolysis, photocatalysis, ultrasonic energy; alternating or direct current high voltage energy fields; or thermal decomposition in conjunction with metal catalysts to effectively (e.g., substantially) decompose airborne oxidizer residues, the metals comprise at least one of platinum or palladium.

Another embodiment described herein takes the form of a system, including: a spray system for treating a surface, comprising: a source of an aqueous-based peroxyacid solution; a source of an activator for activating the aqueous-based peroxyacid solution; and an internally mixed spray nozzle, wherein: the aqueous-based peroxyacid solution and the activator are mixed in the internally mixed spray nozzle to form a peroxyacid-based biocide; and the peroxyacid-based biocide is sprayed from the internally mixed spray nozzle as an atomized peroxyacid-based biocide to treat the surface.

In embodiments, the aqueous-based peroxyacid solution may include a mixture of at least one peroxyacid species of a persulfate, a peroxycarboxylic acid, or a hydrogen peroxide. The activator may include a pressurized stream of ozone containing gas. The internally mixed spray nozzle may be an internally mixed siphoning spray nozzle.

In embodiments, the peroxyacid species of the aqueous-based peroxyacid solution may include peroxycarboxylic acid; and a molar ratio of the peroxycarboxylic acid to ozone molar equivalents in the atomized peroxyacid-based biocide may be 1:140 mEq ozone.

In embodiments, a decontamination system includes: an air neutralization system for removal of residual peroxyacid-based biocide overspray and air-borne contaminates in an airspace, comprising: a blower to circulate an atmosphere in the airspace to be decontaminated; and a destruct component that decomposes the residual peroxyacid-based biocide overspray and the airborne contaminants that are circulated by the blower through the air neutralization system. In embodiments, a destruct component may include a packed powder comprising one or more of platinum or palladium metals; and a thermal source operative to heat the packed powder to a predetermined temperature.

BRIEF DESCRIPTION OF THE DRAWINGS

The disclosure will be readily understood by the following detailed description in conjunction with the accompanying drawings, wherein like reference numerals designate like elements.

Figure 1:
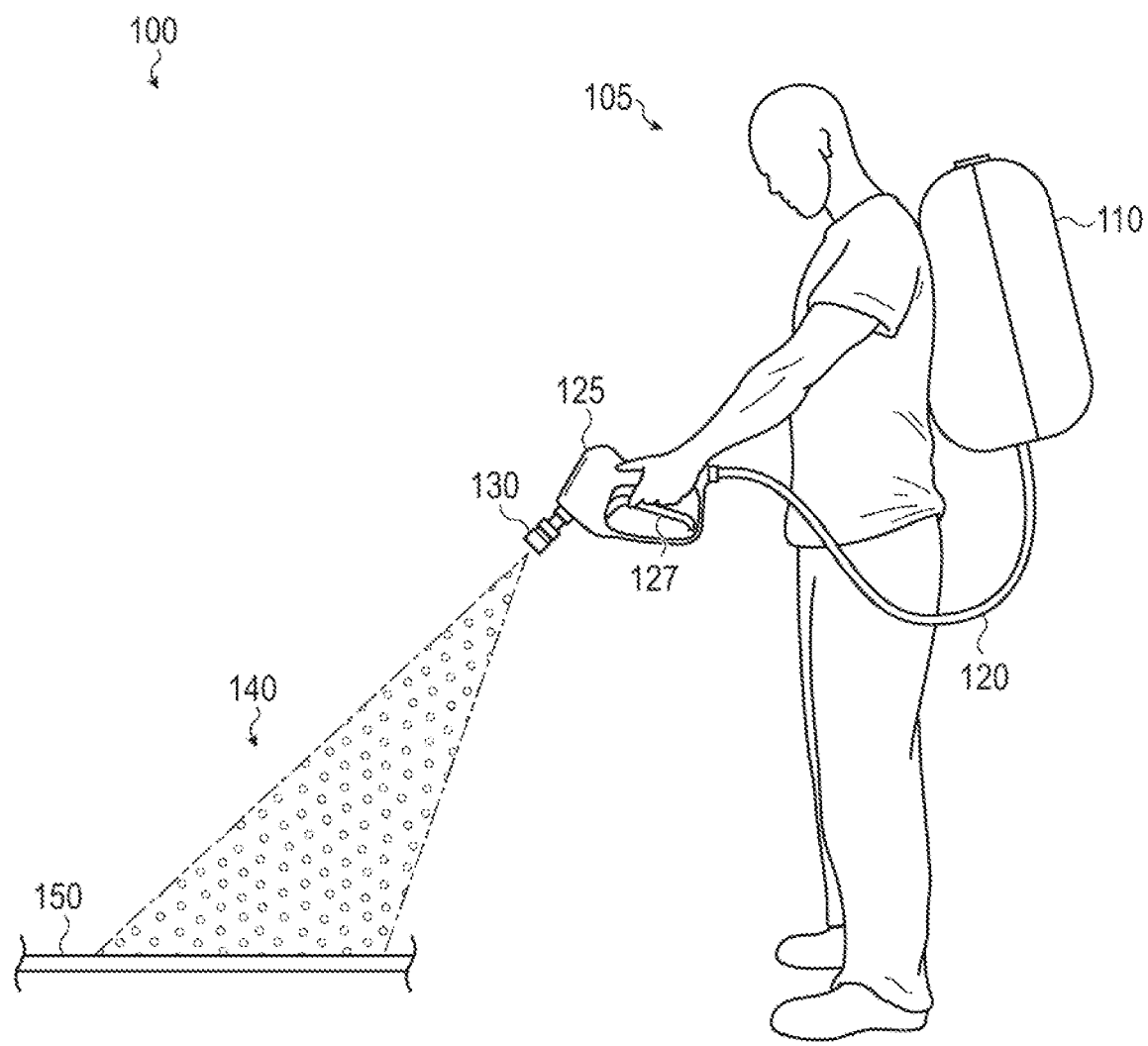
FIG. 1 illustrates an embodiment of a decontamination system.
Figure 2A:
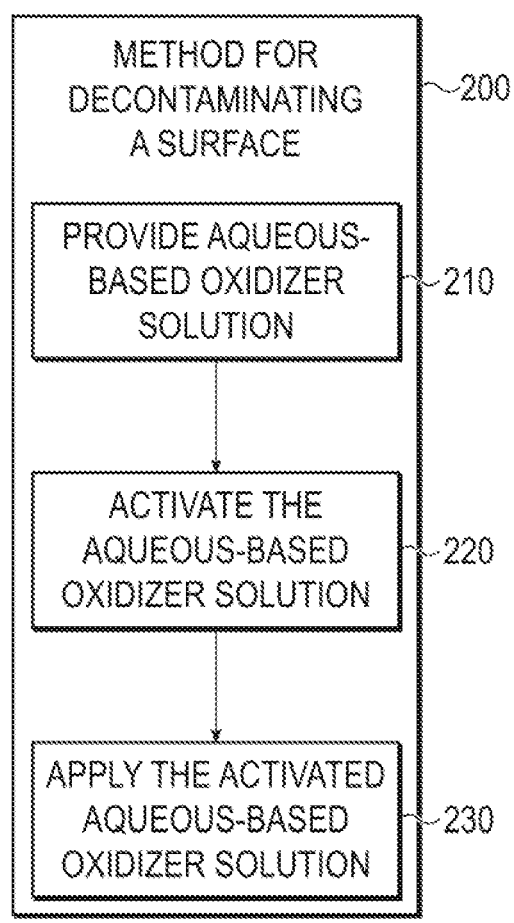
FIG. 2A illustrates a method for decontamination of a surface.
Figure 2B:
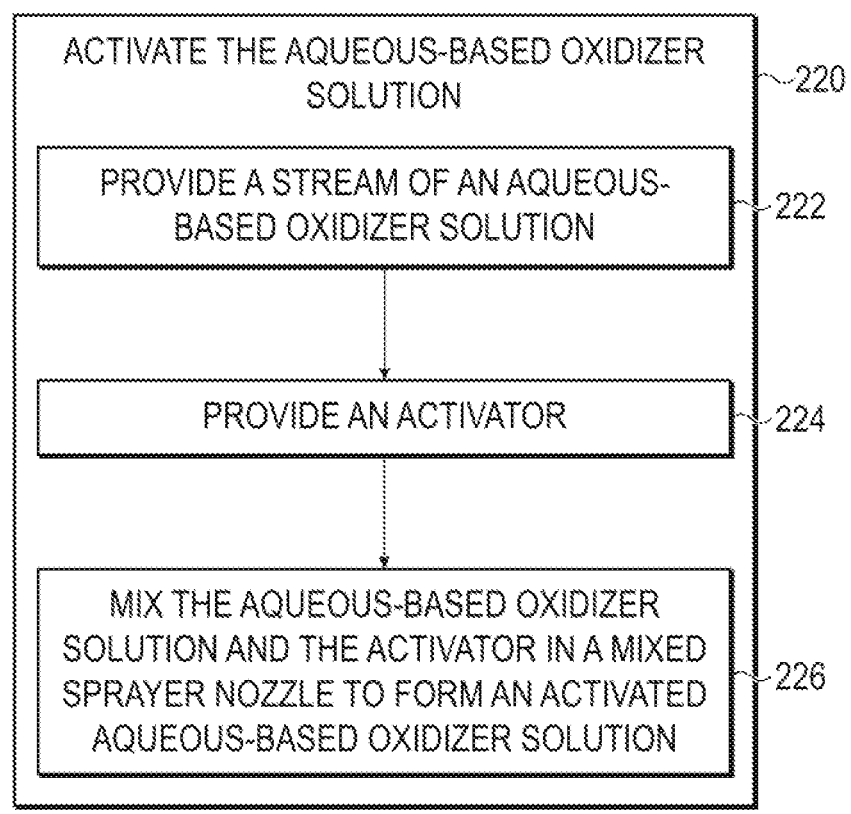
FIG. 2B illustrates another method for decontamination of a surface.
Figure 3:
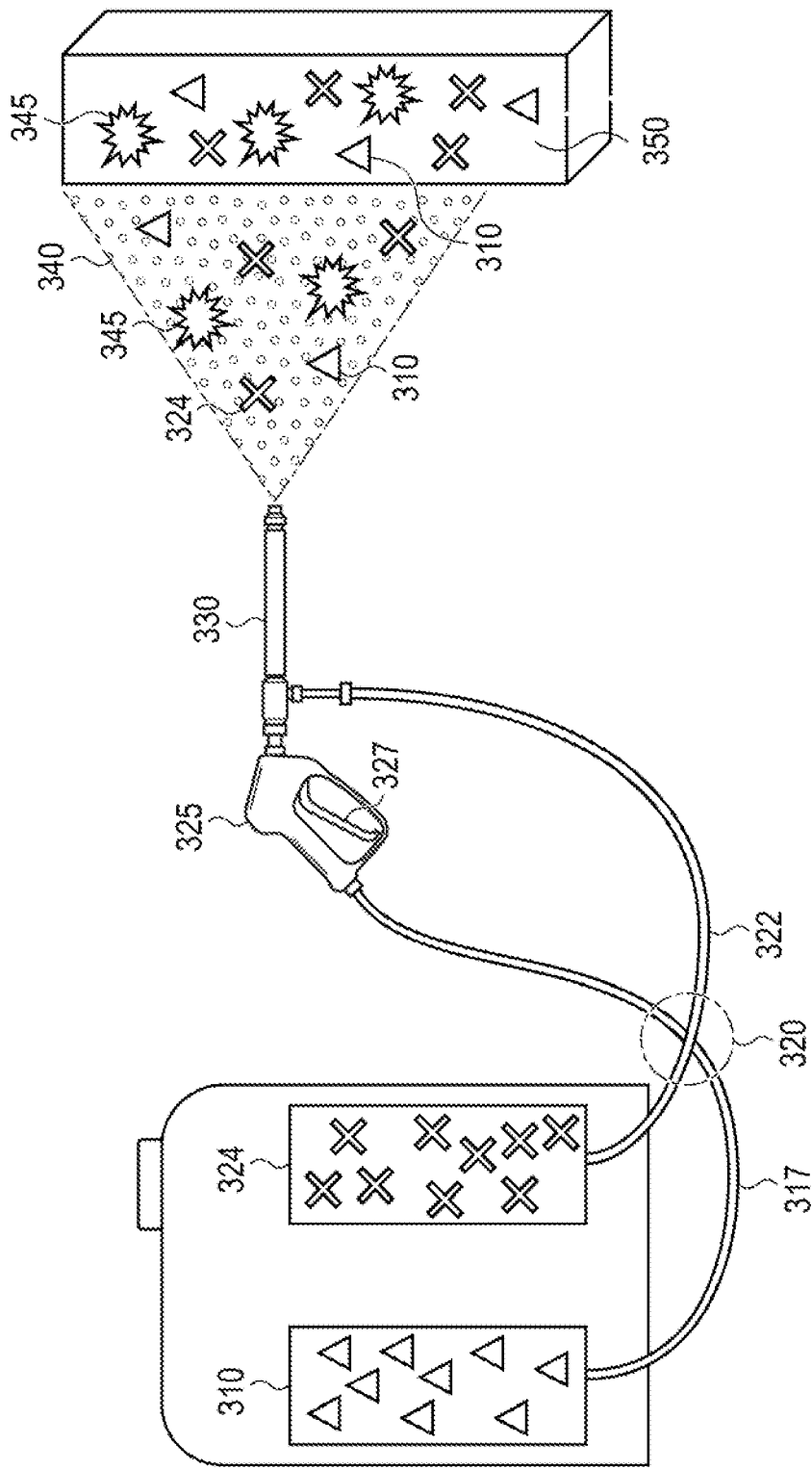
FIG. 3 illustrates a schematic of a system for decontamination of a surface and of the formation of a short-lived, highly oxidizing mixture.
Figure 4A:
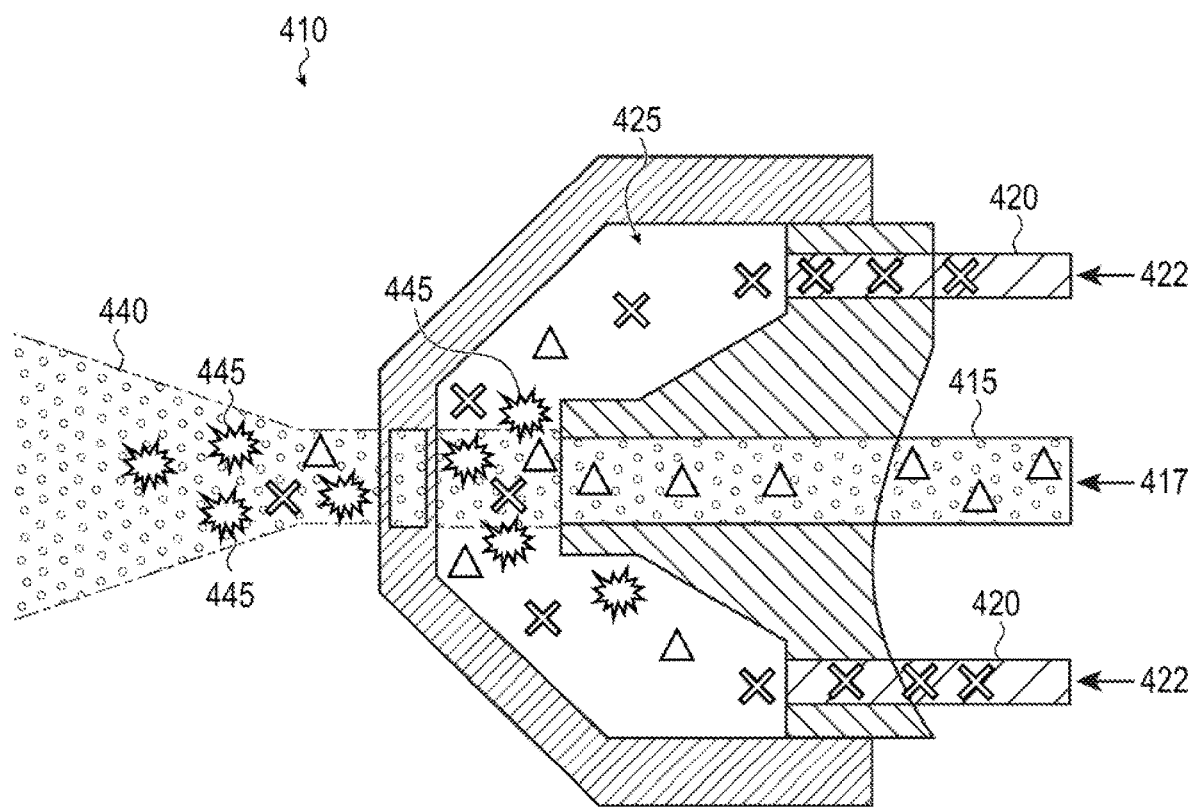
FIG. 4A illustrates an internal mixing pneumatic sprayer.
Figure 4B:
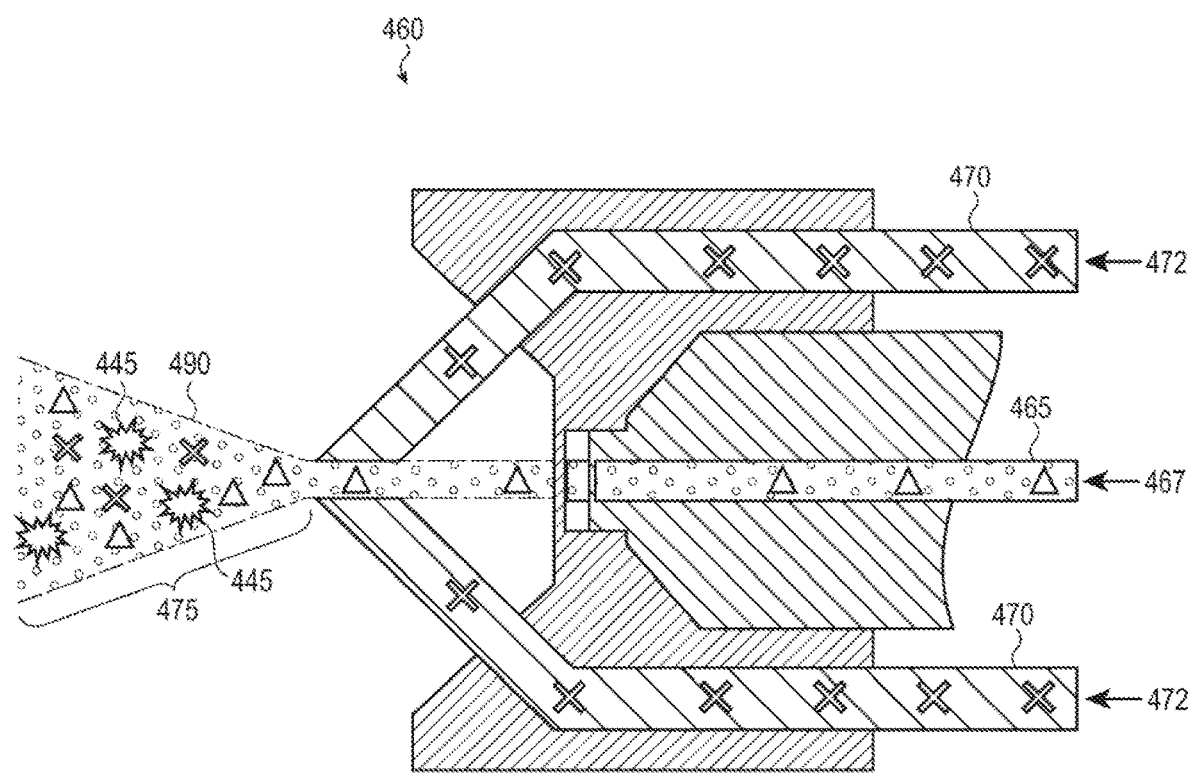
FIG. 4B illustrates an external mixing pneumatic sprayer.
Figure 5:
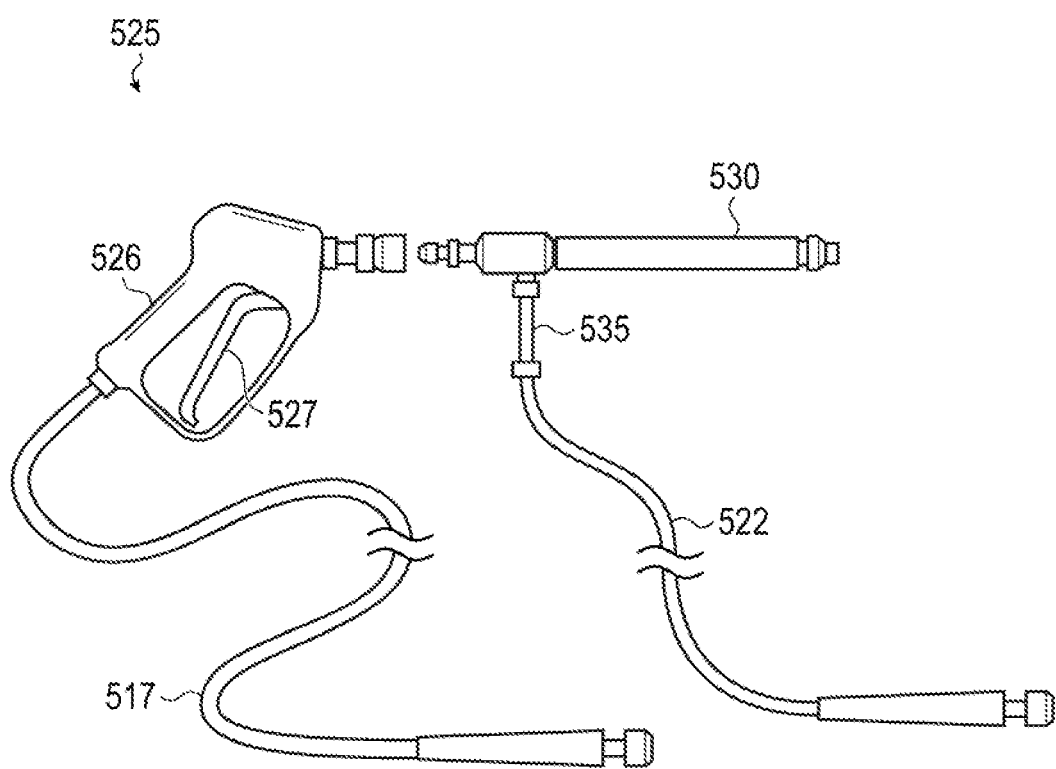
FIG. 5 illustrates a hydraulic sprayer.
Figure 6A:
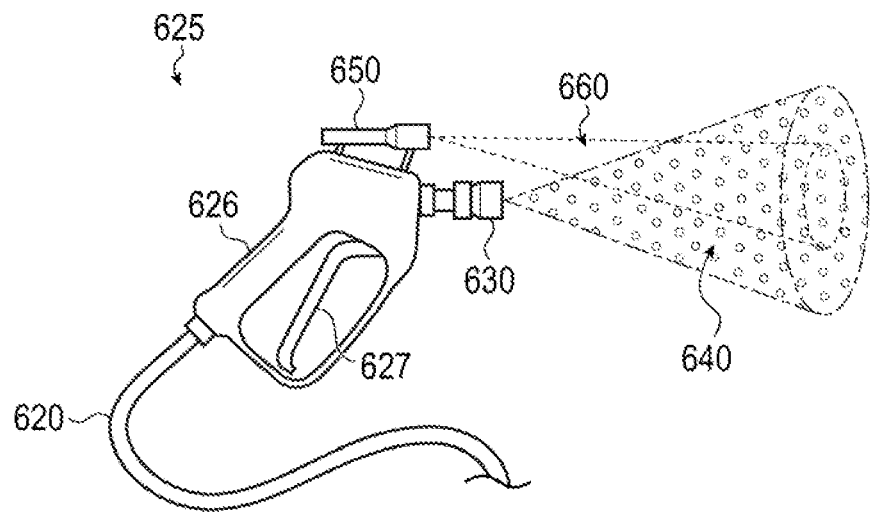
FIG. 6A illustrates a pneumatic sprayer with a UV light source.
Figure 6B:
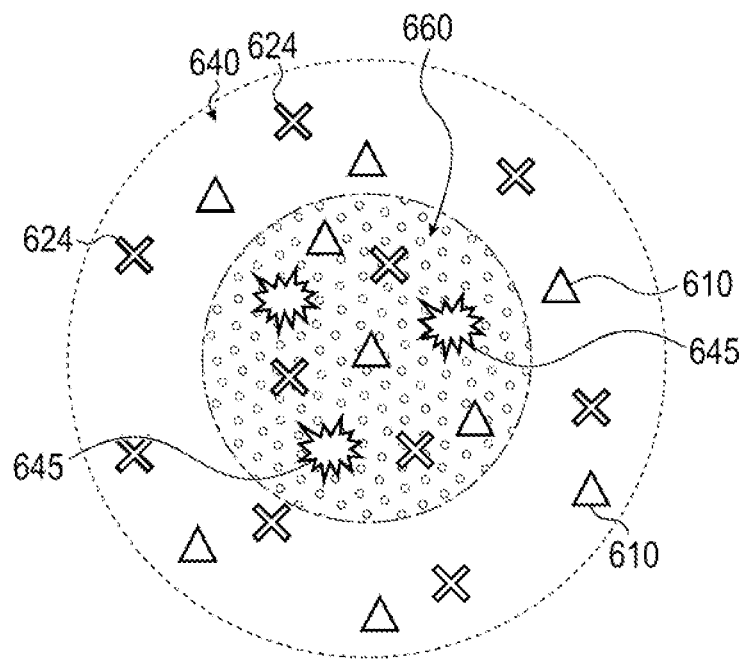
FIG. 6B illustrates a projection of a UV light source on a surface with a mixed solution.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred implementation. To the contrary, the described embodiments are intended to cover alternatives, modifications, and equivalents as can be included within the spirit and scope of the disclosure and as defined by the appended claims.

Overview

The following disclosure relates to methods and systems to decontaminate and disinfect surfaces and airspaces. As used in this description, the term "disinfection" (and variants thereof) relates to killing and/or destroying biological organisms, such as bacteria, viruses, and so on. A disinfectant that kills/destroys biological organisms may also be referred to as being biocidal. Further, as used in this description, the term "decontamination" may be used to describe organism-destroying chemical agents, such as poisons, toxins, and the like. Further still, decontamination may be used to generally describe both disinfection and decontamination.

The methods and systems described herein can be incorporated to decontaminate and disinfect surfaces and airspaces using a short-lived, highly oxidizing mixture of an aqueous-based oxidizer solution and an activator (e.g., a catalyst). The activators comprise at least one of gaseous activators, aqueous activators, and/or ultraviolet light emission activators (e.g., UV photons).

The mixture of an oxidizer solution with the catalyst produces an activated aqueous-based oxidizer solution that is a highly reactive oxygen containing species, and the use of these species in decontamination/disinfection is typically referred to as an Advanced Oxidation Process (AOP). AOPs include various methodologies to produce very reactive, yet short-lived, oxidizers that are capable of neutralizing the most persistent contaminants. Because the lifetimes of generated reactive advanced oxidizers are short, three conditions should be met for AOP to be effective for surface decontamination: (1) the advanced oxidizers should be generated in close proximity to the contaminated surface; (2) the primary biocidal composition should have good decontamination efficacy; and (3) the primary biocidal composition should possess compositional properties that promote radical formation and propagation while reducing or minimizing opportunities for radical inhibition and quenching.

Oxidizers

The advanced oxidizers described above are formed in part from an aqueous based oxidizer solution. The AOP chemistries include peroxygen compositions that include hydrogen peroxide as well as other components that contain the peroxide (OOH) moiety. The compositions contain at least one peroxygen component in concentrations sufficient to be biocidal for surface decontamination, but exclude excess amounts of species that are known to quench radical advanced oxidizers.

It is useful to tightly control the composition of the activated biocidal peroxygen compositions (e.g., the activated aqueous-based oxidizer solution), because excess amounts of certain components can react with the newly generated reactive species to substantially quench the reactive species before they can contact the contaminants. The quenching of the reactive species prevents the propagation and continued formation of additional reactive species in the combined mixture deposited on the contaminated surface. Generally, the molar ratio of the peroxygen component to the activator is preferably less than 250:1, more preferably less than 150:1 and most preferably less than 50:1. Furthermore, the concentration of activator in the combined atomized stream is approximately 1-1000 mg/L. The ratio of activator volume to peroxygen liquid volume is 500:1 to 0.1:1. While general values of molar ratios, concentrations of activator in the atomized stream, and activator volumes are presented here, preventing quenching of the reactive peroxygen species will be discussed in greater detail below in relation to specific oxidizers.

The components of the peroxygen mixture are selected from compositions that are known to form at least one species of sulfate radical, superoxide radical, peroxy radical, acetyl radical, acyloxy radical, methyl radical, or mixtures of these radicals with hydroxyl radicals. Once activated, the aqueous-based oxidizer solutions present a mixture of advanced oxidizers with varying redox potentials, longer half-lives, and mixed reaction mechanisms that offer the multiple active species and modes-of-action for broad disinfection and decontamination capability. The compositions contain at least one peroxygen component in concentrations sufficient to be biocidal for surface decontamination, but exclude excess amounts of species that are known to quench radical advanced oxidizers.

The biocidal peroxygen compositions of the activated aqueous-based oxidizer solution include aqueous mixtures of persulfates, peroxycarboxylic acids, and hydrogen peroxide, or peroxide releasing components (percarbonate, perborate, urea peroxide) that contain the peroxide (OOH) moiety, for example. Persulfates, peroxycarboxylic acids, and hydrogen peroxide are activated by light, heat or chemical reactions to form highly reactive radical species including hydroxyl radical (HO·), perhydroxyl radical (HOO·), super oxide ($O_2^-$), acetyl radical ($CH_3C(=O)O·$), acyloxy radical ($CH_3C(=O)OO·$) sulfate radical ($SO4·^-$) as well as singlet oxygen ($^1O_2$). These advanced, reactive oxidizer species are potent oxidizers, capable of destroying pathogens and other surface bound contaminants, and the eventual byproducts of decontamination are environmentally benign and include water, oxygen, acetate, and sulfate, depending on the exact composition.

For example, AOP chemistries include, but are not limited to, peroxygen-based solutions that comprise at least one of hydrogen peroxide (HP), peroxyacids, persulfates, peroxycarboxylic acids, or mixtures thereof. Specifically, activated aqueous-based oxidizer solutions may include a peroxyacid mixture comprising at least one of a persulfate, a peroxycarboxylic acid, or a hydrogen peroxide.

In embodiments, a peroxygen mixture may consist of at least one peroxyacid, persulfate, or hydrogen peroxide at concentrations that are biocidal. The concentration of peroxygen may be between 0.001-2% wt., and the molar ratio of peroxygen species to activator species may be less than 250:1.

In some embodiments, the peroxyacid is a non-equilibrium mixture peracetic acid wherein the peracetic acid is in non-equilibrium composition with regard to the relative composition of hydrogen peroxide and acetic acid. Non-equilibrium peracetic acid compositions can be produced by reaction of hydrogen peroxide with a suitable acyl group donor under alkaline conditions. Compositions of non-equilibrium peracetic acid can be produced that contain relatively small quantities of excess peroxide and minimal amounts of acetic acid. These compositions are particularly preferred for use in the inventive process because they can contain less radical quenching species compared to equilibrium mixtures. Furthermore, the non-equilibrium peracetic acid mixtures can be produced with varying quantities of PAA:HP and a virtually any pH (typically between pH=2-12).

In some embodiments, the peroxyacid is a persulfate. The persulfate is peroxymonosulfate and/or peroxydisulfate, wherein the peroxymonosulfate is selected from one or more of the group consisting of potassium peroxymonosulfate, sodium peroxymonosulfate and ammonium peroxymonosulfate, wherein the peroxydisulfate is selected from one or more of the group consisting of potassium peroxydisulfate, sodium peroxydisulfate and ammonium peroxydisulfate.

Sulfate radical ($SO_4 \cdot^-$) can be produced by radiolysis, photolysis, pyrolysis or chemical activation of peroxymonosulfate (PMS, e.g., $HSO_4^-$) or persulfate (PS, e.g., $S_2O_8^{2-}$). The oxidation potential of PMS (1.82 V) is higher than $H_2O_2$ (1.76 V) but lower than PS (2.01 V). Oxone, a commercial name of potassium peroxymonosulfate ($2KHSO_5 \cdot KHSO4 \cdot K^-SO_4$), is a versatile and environmentally friendly oxidant that has been widely utilized for bleaching, cleaning and disinfection and more importantly as a favorable source of PMS. In fact, PMS can be activated by various transition metallic ions, such as $Mn^{2+}$, $Ce^{3+}$, $Ni^{2+}$, $Fe^{2+}$, $V^{3+}$, $Ru^{3+}$ and so forth. Persulfates include, but are not limited to ammonium persulfate, and alkali metal salts of persulfate.

In certain embodiments, the peroxyacid is a hydrogen peroxide that is an aqueous solution of hydrogen peroxide, or a mixture that contains a component that produces hydrogen peroxide in aqueous solution. For example, the component that produces hydrogen peroxide is selected from one or more of the group consisting of sodium or potassium salts of percarbonate, perborate, persulfate, or peroxides of carbamide or urea.

The oxidizing mixtures may also include other components including surfactants, solvents, builders, pH modifiers, colorants, fragrances and other beneficial components that are application specific.

The oxidizing mixtures may be any concentration that is necessary for required decontamination or antimicrobial performance. The oxidizing components may be present in concentration up to 10% wt., or preferably up to 2%, or more preferably up to 1% wt. The oxidizing mixtures may also include other components including surfactants, solvents, builders, pH modifiers, colorants, fragrances and other beneficial components, that are application specific. For example, other beneficial compounds may include unsaturated fatty acids, including oleic acid, linoleic acid, linolenic acid as well as natural or synthetic oils containing triglycerides of these and related components.

Activators

The oxidizing mixtures are typically activated at or near the surface to be decontaminated or disinfected, because the advanced oxidizers are extremely short-lived and therefore operate best when activated on or near the surface. The oxidizing mixtures can be activated by heterogeneous chemicals (catalysts), homogeneous chemicals (catalysts), or by activating photons.

In embodiments, the activation method requires introduction and mixing of the activator (catalyst) component with one or both of the stream or the spray of the oxidizing mixture. Upon mixing, a portion of the oxidizing mixture is substantially immediately reactive with the catalyst, thereby, forming the activated advanced oxidizers in the spray stream. Another portion of the activated oxidizing mixture entrains the activating chemical (catalyst) component (in the case of heterogeneous catalysts and homogeneous catalysts) and delivers a portion of the activating chemical (catalyst) to the surface along with the activated oxidizing mixture. Once covering the surface, the activating chemical (catalyst) continues to react and generate advanced oxidizers on the surface to be decontaminated or disinfected.

Homogeneous chemical activators (catalysts) may include, but are not limited to aqueous soluble transition-metal complexes, and soluble transition-metal salts, for example. Soluble photocatalysts may also be utilized. The homogeneous activator may include a liquid solution comprising at least one or more of $Fe^{2+}$, $Mn^{2+}$, $Co^{2+}$, $Ag^{1+}$, $Ce^{2+}$, $Ni^{2+}$, or $V^{3+}$.

Heterogeneous chemical activators (catalysts) may include, but are not limited to ozone gas ($O_3$), aqueous insoluble transition-metals (small particles), or other insoluble activating materials like activated carbon, for example. Insoluble catalysts such as a liquid suspension containing insoluble suspended materials containing transition metals may also be utilized.

Generally, the stoichiometric ratios of aqueous peroxygen droplets to gaseous ozone are defined by the volumes and concentrations delivered from the sprayer nozzle to the surface during the surface decontamination step. In embodiments, the stoichiometric ratio of gaseous ozone to aqueous peroxygen species in the atomized spray is less that 1:250, more preferably less than 1:150, and most preferably less than 1:50.

Ultraviolet light emission activators (e.g., UV photons) may be introduced to the spray stream of the oxidizing mixture. Similarly, photons may be introduced to the surface after the surface is covered with oxidizing mixture. The photons may be of a specific wavelength or a range of wavelengths that directly activate the oxidizers to form advanced oxidizers. In another embodiment, the photons may be of a wavelength that activates a homogeneous or heterogeneous photocatalyst.

In embodiments, the ultraviolet light emission activators may be produced by lasers, UV lamps, and so on. The ultraviolet light emission may include only UV wavelengths between 200-420 nm, or may include visible light emission, as well.

In all of the abovementioned embodiments, the activation chemical (catalyst), or mixtures of activators (catalysts), or combinations of at least one chemical activator (catalyst) and activating photons are introduced into the spray stream of the oxidizing mixture to form advanced oxidizers at and near the surface that is being sprayed. The advanced oxidizers are potent and short-lived species that boost the performance of the disinfectant or decontaminating mixture on the surface.

Activating the Oxidizing Mixtures

Since the activated oxidizers have short lifetimes, they must be mixed very near or at the surface to be treated. These short-lived, highly oxidizing mixtures are produced at or near the surface to be treated by means of a nozzle that mixes the aqueous-based oxidizer solution with the activator close to the surface. In embodiments, the nozzle may mix the oxidizer solution and the activator by a number of different approaches, and through a variety of nozzle designs. The nozzle also applies the activated oxidizer solution to a surface, an airspace, or both. Independent of the nozzle design, the activated oxidizer solution (e.g., the activated aqueous-based oxidizer solution) may include unreacted oxidizer and unreacted activator. The mixture of the activated aqueous-based oxidizer solution, the unreacted oxidizer, and the unreacted activator comprises a mixed solution. The unreacted oxidizer and unreacted activator included in the mixed solution each have strong oxidizing capability, and will decontaminate and disinfect the surface, even without reacting together. The same is true for the activator UV photons. The UV photon light at least partially decontaminates and disinfects surfaces on which it interacts, as well as with any gaseous contaminates with which it comes into contact.

The selection of the nozzle for mixing the oxidizing solution and the activator is based, in part, on the nature of the activator. For example, there are nozzles that effectively mix the heterogeneous (gaseous) activators with the oxidizing mixture, nozzles that mix the heterogeneous (liquid) activators with oxidizing mixture, and nozzles that allow the UV photon activators to interact with the oxidizing mixture. The types of nozzles and how they are incorporated into mixing the oxidizing solution and the activator is disclosed further below.

The activator may be introduced to the oxidizer solution just upstream or just downstream of the sprayer nozzle constriction. It is critical that the activator is not introduced or blended with the oxidizing mixture too far upstream. Mixing the oxidizing mixture and the activator too far upstream initiates the activation too early, and the activated aqueous-based oxidizer solutions will complete their reactions prior to landing on the surface to be decontaminated and/or disinfected.

In embodiments, the gaseous heterogenous activators, such as ozone (e.g., $O_3$), may be mixed with a stream of the oxidizing solution by a mixing nozzle (e.g., a mixed sprayer nozzle). Some mixed sprayer nozzles are designed to cause the mixing to occur inside of a mixing chamber internal to the nozzle. Such mixing nozzles are identified as internally mixed sprayer nozzles. The internally mixed sprayer nozzles have a mixing chamber inside of the nozzle that allows the liquid oxidizing solution to be mixed with the flowing gaseous activator inside of the nozzle. Thus, the oxidizing solution is exposed to the activator inside the mixing chamber and at least some of the oxidizing solution is activated in the mixing chamber. The mixed solution is expelled from the nozzle. The unreacted gaseous activator and the unreacted oxidizing solution of the mixed solution will continue to react together as the mixed solution streams away from the nozzle, and continues even on a surface to which the mixed solution is applied, as well as the airspace around the nozzle. Thus the surface being treated and the airspace around the nozzle are exposed to the short-lived, highly oxidizing solution, as well as the unreacted gaseous activator and the unreacted oxidizing solution.

Alternatively, in embodiments, some mixed sprayer nozzles are cause the mixing to occur outside of the nozzle. In this case, the gaseous heterogenous activators, such as ozone (e.g., $O_3$), may be mixed with a stream of the oxidizing solution by mixing external to the nozzle. Such mixing nozzles are identified as externally mixed sprayer nozzles. Thus, the gaseous activator is mixed into the streaming oxidizing mixture after the oxidizing mixture has been expelled from the nozzle. The externally mixed sprayer nozzle directs one or more streams of the gaseous activator toward the liquid stream of the oxidizing solution. Activation of the oxidizers is initiated where the gaseous stream(s) and liquid stream collide and the mixing begins. The activation of the oxidizers continues as the mixed solution flows away from the nozzle and toward the surface to be treated and the surrounding airspace. Thus the surface being treated and the airspace around the nozzle are exposed to the short-lived, highly oxidizing solution, as well as the unreacted gaseous activator and the unreacted oxidizing solution.

In embodiments, the activator may be a heterogeneous chemical activator (catalyst) that may include, but is not limited, to aqueous soluble transition-metal complexes, soluble transition-metal salts, soluble photocatalysts, and/or a combination thereof.

Furthermore, in embodiments, the activator may be a homogeneous activator that includes solutions of aqueous soluble transition-metal complexes, soluble transition-metal salts, and/or a combination thereof.

In both cases, for both heterogeneous and homogeneous activators, the liquid mixture containing the activator (e.g., catalyst) can be introduced just upstream or just downstream of the sprayer nozzle constriction. The mixing of the oxidizer mixture and the liquid activator occurs in a nozzle equipped to accommodate the injection of a second liquid into a first liquid.

The activator containing liquid can be introduced into the spray stream using any manner consisting of a conduit to deliver the liquid activator stream and any manner to combine the streams. The liquid catalyst may be pumped by any suitable type of pump, may be siphoned by a flowing gas, or alternatively may be injected by any suitable type of Venturi-driven injection system. In embodiments, the liquid activator stream is introduced into the oxidizing spray stream via a Venturi inductor at the nozzle of the sprayer. In embodiments, the liquid activator stream is introduced into the oxidizing spray stream via an electric pump and is blended with the oxidizing mixture just upstream of the nozzle.

The sprayer nozzles may be hydraulic sprayers, or Venturi-type sprayers, among others. In these sprayers, the oxidizing solution and the liquid activator mix together at elevated pressures before being expelled from the nozzle through the constriction. The solution expelled from the sprayer nozzle includes the short-lived, highly oxidizing solution, as well as unreacted liquid activator and unreacted oxidizing solution. Thus the surface being treated and the airspace around the nozzle are exposed to the short-lived, highly oxidizing solution, as well as the unreacted gaseous activator and the unreacted oxidizing solution.

Furthermore, in embodiments, the activator may be ultraviolet light emission activators (e.g., UV-based light). For the purposes of this disclosure, the terms UV-based light, UV photons, UV photon light, UV radiation, UV-based light radiation, and UV light are intended to be synonymous and to generally refer to UV radiation. In the case of UV photon activators, the UV photons may be provided to the oxidizer solution in the nozzle, after the liquid passes through the nozzle, at the surface to be treated, or any combination of these locations.

In embodiments, the oxidizing solution is activated by being irradiated by the UV-based light while the oxidizing solution is streaming toward the surface to be treated. Upon irradiation, some of the oxidizing solution is activated to form the activated aqueous oxidizing solution, and some of the unreacted oxidizing solution remains in the mixed solution. The UV-based light radiation may irradiate a surface under treatment, as well as the oxidizer stream. The UV light source may be mounted on the sprayer configured in a way to allow the UV radiation to intersect with the spray of the oxidizing solution and to illuminate the surface under treatment, as well as the airspace surrounding the nozzle.

In embodiments, the UV light source may be located inside of a nozzle in order to irradiate the oxidizing solution before it is expelled though the constriction of the nozzle. The UV photons may be generated by a UV light source including light emitting diodes (LEDs), UV lasers, mercury or xenon arc-lamps, and so on.

In embodiments, the UV light source may be used as an activator in combination with a heterogeneous, a homogeneous activator, or both. That is, the use of the UV-based light source activator does not prevent the use of chemical activators, and may be incorporated to increase the reactivity of the oxidizer solution and the mixed solution.

In embodiments, the UV wavelength is selected to match the wavelength of the oxidizer component absorption band to produce advanced oxidizers excited states.

In embodiments, the UV wavelengths are selected to correspond to the absorption bands of one or more dissolved or suspended photocatalysts in a liquid activator (catalyst) stream that is introduced and mixed with the liquid oxidizer mixture at or near the sprayer nozzle. Some examples of photolytic activation to generate advanced oxidizers are shown below:

$$H_2O_2k+h\nu \rightarrow 2 \cdot OH$$

$$CH_3C(=O)OH+h\nu \rightarrow CH_3C(=O)O \cdot + \cdot OH$$

$$CH_3C(=O)O \cdot \rightarrow \cdot CH+CO_2$$

$$\cdot CH_3+O_2 \rightarrow CH_3OO \cdot$$

$$CH_3C(=O)O_2H+ \cdot OH \rightarrow CH_3C(=O)O_2 \cdot +H_2O$$

$$CH_3C(=O)O_2H+ \cdot OH \rightarrow CH_3C(=O) \cdot +O_2+H_2O$$

$$CH_3C(=O)O_2H+ \cdot OH \rightarrow CH_3C(=O)OH+ \cdot OOH$$

$$CH_3C(=O)O_2H+CH_3C(=O)O \cdot \rightarrow CH_3C(=O)O_2 \cdot + CH_3C(=O)OH$$

$$S_2O_2^{2-}+h\nu \rightarrow 2\ SO4 \cdot^-$$

In embodiments, the UV-based light source may be configured as a strobe source. That is, the UV-based radiation may be applied in an alternating on-off manner. For example, an on-off cycle may be 1 second on followed by 1 second off. In embodiments, the on-off cycles may have equal times of on and off. In embodiments, the on-off cycles may have a longer on duration and a shorter off duration, and vice versa. In embodiments, the UV-based light source may be configured to charge up to provide a very intense flash having a high flux of UV photons. The charging may be accomplished by using a capacitor circuit, or by other methods.

In embodiments, the projected spot size may be varied by focusing the UV light to increase or decrease the intensity of the UV-based radiation. In embodiments, there may be patterns in the projected UV radiation. For example, the UV radiation may be configured to irradiate a circular area while maintaining a center concentric circular area that does not receive the UV radiation.

Generally, the activator is not introduced or blended with the oxidizing mixture too far upstream. That is, the activated oxidizing mixture (e.g., the aqueous-based oxidizer solution) cannot be prepared prior to mixing at the nozzle, or the activated mixture will be quenched and therefore not highly oxidizing. For example, the highly reactive oxidizing mixture cannot be stored in a container, such as bottled in advance, because mixing required for storage would initiate the activation too early, and the advanced oxidizers will complete their reactions prior to landing on the surface to be decontaminated or disinfected.

Ozone ($O_3$) as a Chemical Activator

In embodiments, gaseous $O_3$ is utilized as a heterogenous chemical activator. The gaseous $O_3$ may be generated by passing dry air or $O_2$ through an electric powered $O_3$ generator, and is supplied to the tip of the sprayer nozzle via ozone-rated tubing. The ozone is mixed into the turbulent spray stream either just downstream of the sprayer nozzle constriction, as in the case of an externally mixed sprayer nozzle, or just upstream of the sprayer nozzle constriction as in the case of an internally mixed sprayer nozzle. For each of the nozzles, a portion of the supplied ozone is absorbed and dissolves into the droplets of the oxidizing mixture. Another portion of the supplied $O_3$ gas remains undissolved and is carried along with the droplets to be deposited onto the surface to be disinfected or decontaminated. A third portion of the supplied $O_3$ gas does not interact with the droplets or turbulent spray stream and is released into the airspace between the sprayer and the surface.

The portion of $O_3$ gas that dissolves into the spray droplets reacts with the oxidizing mixture to form advanced oxidizers in the droplets. This reaction can continue even after the mixture is deposited onto the surface.

In embodiments, the aqueous oxidizer mixture also contains components that react with $O_3$ activator to form long lasting secondary oxidizers that can leave a protective residue on the contaminated surface via an ozonolysis step. The ozonolysis step involves the reaction of $O_3$ with alkene compounds, for example in unsaturated vegetable oils or free fatty acids and esters thereof, to form stable ozonolysis product mixtures (e.g. ozonides/hydroperoxides). The reactive components may include unsaturated fatty acids, including oleic acid, linoleic acid, or linolenic acid as well as natural or synthetic oils containing triglycerides of these and related components. Vegetable oils that readily react with $O_3$ include mixtures of at least one oil of sunflower, olive, sesame, soybean, linseed, hemp, grape seed, theobroma, coconut, jojoba, rapeseed, and corn plants. In these embodiments, a portion of the dissolved $O_3$ reacts with peroxygen species to form short lived advanced oxidizers while another portion of dissolved $O_3$ simultaneously reacts with the alkene components forming mixtures of ozonides and hydroperoxides. The formed ozonides/hydroperoxides are more stable (less reactive) than the generated advanced oxidizers and the primary peroxygen oxidizers, and do not evaporate as quickly as the aqueous peroxygen oxidizers, because of the relatively high boiling points of the alkene compounds. After the contaminated surface has been treated with the activated oxidizer mixture, including the ozonides/hydroperoxides, the generated advanced oxidizers, and the primary peroxygen oxidizers, the advanced oxidizer species and the primary aqueous peroxygen mixtures quickly oxidize and destroy surface bound contaminants and evaporate, leaving behind a stable and long lasting fatty acid based film, including the stable ozonides/hydroperoxides, covering the surface. The stable ozonides/hydroperoxides provide an active oxidizing surface residue to prevent subsequent recontamination of the treated surface.

The portion of $O_3$ gas that is physically entrained into the turbulent stream remains unreacted, but is delivered to the surface along with the liquid oxidizer. The gaseous $O_3$ can then continue to dissolve into the thin coating of oxidizing liquid on the surface, effectively replenishing the dissolved $O_3$ that is continually consumed by reaction with the oxidizing components. The undissolved but entrained $O_3$ that is delivered to the surface is also independently and directly an effective biocide or oxidizer that contributes to the observed performance of the oxidizing mixture even if it remains unreacted. For example:

Excess $O_3$(gas)+aqueous droplets→$O_3$(dissolved)+$O_3$ (gas)

Excess $O_3$(gas)+aqueous droplets→$O_3$(entrained)+$O_3$ (gas)$H_2O_2$(aq.)+$O_3$(aq.)→·OH+$O_2$ The portion of $O_3$ gas that doesn't interact with the spray stream is effective at decontaminating or disinfecting any airborne contaminants or pathogens in the airspace between the sprayer and the surface.

The supply of gaseous $O_3$ to the liquid sprayer stream produces a synergistic effect, both adding to the performance of the liquid oxidizer as well as reacting with the liquid oxidizer mixture to further enhance the performance. The performance enhancement is observed in the log-kill performance as well in shorter contact time needed for the required log-kill performance. This performance enhancement is illustrated in the Examples section of this disclosure.

The solubility of $O_3$ in room temperature aqueous solution depends on the concentration of $O_3$ in the gas phase (as described by Henry's Law), and the temperature of the liquid (aqueous) phase. Since ozone generators typically produce relatively low ozone concentrations <1%, the amount of ozone that can be transferred to the aqueous phase is usually low. Concentrations of ~5ppm ozone may be typical max $O_3$ concentrations attainable by common methods It is beneficial to increase the availability of $O_3$ (e.g., ozone) to accelerate reaction kinetics to form advanced oxidizer species. The presence of excess gaseous $O_3$ in close proximity to high surface area atomized droplets of aqueous based oxidizer enhances the kinetics of $O_3$ into the aqueous phase, thereby increasing the concentration of $O_3$ in the solution beyond the concentration calculated by Henry's Law. The kinetics of $O_3$ dissolution can be further enhanced by other beneficial mixture components that modify the uptake properties of $O_3$ of the aqueous phase. For example, surfactants and non-polar co-solvents can be added to lower the surface tension of the aqueous droplets and increase the rate of excess $O_3$ uptake. The excess $O_3$ gas will further replenish the dissolved $O_3$ that has been consumed by reaction to form advanced oxidizers, allowing more advanced oxidizers to form and propagate at or near the contaminated surface.

In embodiments, the use of an externally mixed sprayer to mix the ozone with the aqueous oxidizer solution advantageously involves the activation of the aqueous formulation during spray application, by injecting the activating gas, such as $O_3$ in dry air, directly in the liquid spray after the point of constriction (nozzle). That is, a fixed pressure of ozone gas may be directed (e.g., "focused") onto a stream of the aqueous oxidizer outside of the nozzle and the mixing of the ozone activator with the aqueous oxidizer occurs external to the nozzle. This method possesses the following advantages.

An advantage of mixing of the ozone activator with the aqueous oxidizer occurs external to the nozzle is that the aqueous oxidizer stream is instantly activated immediately prior to hitting the surface to be disinfected, giving short-lived, highly oxidizing mixtures time to exist on the surface.

Another advantage of mixing of the ozone activator with the aqueous oxidizer occurs external to the nozzle is that the injection of $O_3$ gas into a turbulent stream of droplets allows the gas to mix and interact with an extremely large surface area (dependent on droplet size,) which is expected to enhance the dissolution efficiency of gaseous $O_3$ into the liquid phase.

In embodiments, alternatives to ozone injection post-nozzle include either just prior to the nozzle (such as described for the internally mixing nozzles), or directly into the bulk aqueous tank (sparging). The maximum ozone concentration dissolved in the aqueous oxidizer stream would be the same for all three embodiments, at a given temperature and the same Henry's Law conditions.

In embodiments, the solubility of $O_3$ in aqueous solutions and the efficiency of activation is increased by introducing a blend of ozone and at least one surfactant, or at least one non-aqueous solvent, or both to the aqueous mixtures, leading to increased ozone solubility into the aqueous spray. The room temperature solubility of $O_3$ in concentrated surfactant mixtures, or aqueous mixtures that include a portion of at least one non-aqueous solvent is significantly increased compared to the $O_3$ solubility in aqueous solutions alone. This significantly increases the quantity and concentration of $O_3$ reaching the surface and blending with the aqueous droplets and the surface site. One way this is achieved is by utilization of a Venturi-type injector that blends the target amount of liquid surfactant into the aqueous oxidizer stream. There may be other ways of utilizing this effect of enhanced solubility, like alternative solvents (e.g. alcohols) or other high solubility compounds. The sprayer is modified to allow the tank (reservoir) of high ozone-solubility solvent or solvent mixtures to be 'pre-charged' with $O_3$, prior to blending into the sprayed stream of aqueous oxidizer.

In embodiments, the quantity of ozone that is delivered to the surface along with the aqueous oxidizer stream can be increased by utilizing a foaming agent to entrain even larger volumes and higher concentrations of ozone. The mixture of ozone foam and aqueous oxidizer stream can provide significant quantities of ozone for reaction with aqueous oxidizers as well as provide excess ozone quantities that replenish the soluble ozone that is depleted via reaction with oxidizers. The large volume of higher concentration ozone is also available for direct oxidation of contaminants.

Ozone bubbles contribute localized regions of high ozone concentration that are available to interact directly with pathogens or contaminants at the surface, or suspended in the airspace, as well as a means of transporting and delivering high-concentration aliquots of ozone to replenish the depleted ozone that has reacted. Additionally, airborne suspended bubbles of ozone can supply localized zones of high concentration ozone into the neutralization component (described below) where reaction with airborne contaminants will occur, following activation and oxidizer destruction. This is a method for utilizing the benefits of high concentration zones of ozone while keeping the background airborne ozone concentration below regulatory limits.

In embodiments, ozone bubbles may be electrostatically charged. The combination of electrostatically charged ozone bubbles (via sprayer) enables strong interaction with charged contaminants and localized delivery of high concentration ozone to the activation matrix in the activating/neutralizing component for enhanced contaminant destruction.

In embodiments, activating UV photons are introduced to the spray stream, the airspace between the sprayer nozzle and to the surface by irradiating the spray stream and the surface with the UV photon light, as described above. This is performed by including a light source as part of the sprayer. The light source can be a broad spectrum of wavelengths (white light) or alternatively one or more select wavelengths of light. The light source can be either continuous light or intermittent flashes. The light source can be any source of light including incandescent light sources, LED light sources or laser light sources for example. The light source can be of any intensity, or photon flux, that is capable of photoactivating the oxidizer components in the thin layer surface coating or alternatively the added photocatalysts in order to generate effective concentrations of advanced oxidizers.

Simultaneous Surface and Airspace Decontamination

The methods and systems described above generate an activated oxidizer stream created at a nozzle of a sprayer and delivered to a surface that is to be decontaminated and/or disinfected. Structural, physical, and application specific parameters can be varied to tune the chemical and physical properties of the sprayer stream that is dispensed from the sprayer nozzle to the surface. The following parameters may be used to adjust the chemical and physical properties of the oxidizer spray stream.

In embodiments, the nozzle diameter may be varied to adjust the droplet size of the mixed solution. As described above, the droplet size can affect to concentration of ozone being carried in the droplets. The droplet size can also affect the interaction of the UV photons with the oxidizer solution. For example, the liquid oxidizer spray may be supplied to a surface utilizing smaller droplet size (high surface area) and under constant irradiation. In this case, the UV photon flux will more efficiently activate the airborne droplets to generate advanced oxidizers, which interact with contaminants in the airspace between the sprayer nozzle and the surface. Further, the nozzle diameter may affect the size of the active surface area of the decontamination solution deposited on a surface to be treated.

In embodiments, the velocity of the spray may be varied. By varying the spray velocity, linear velocity of the droplets and entrained gases can be optimized for decontaminating and disinfecting surfaces, and or airspace. In embodiments, the optimal linear velocity for decontaminating airspace may differ from the optimal velocity for decontaminating airspace.

In embodiments, the proportion of liquid or gaseous catalyst stream to liquid oxidizer stream may be varied to optimize activation rates, as well as decontamination efficiency. The proportion of activator to oxidizer can be determined for relative volumes of each, for relative concentrations of each, and for relative flow rates of each. These proportions may be expressed as volume ratios, molar ratios, and/or relative flow rates.

In embodiments, the presence, or not, of an electrostatic charge on the droplets, as well as the amount of the charge may be varied. The droplets may be passed through an electric field to apply an electrostatic charge to the droplets. The presence of an electrostatic charge on the droplets may improve the surface coverage and liquid oxidizer adhesion to the surface to be decontaminated, and also enhance the interaction of airborne liquid droplets with surface charged airborne contaminants.

In embodiments, the distance from sprayer nozzle to the surface to be treated may be varied to control the amount and/or surface coverage of the oxidizing solution. Depending on the nature of the contaminate and/or the infectious agent, the amount and depth of the oxidizing solution may be varied to optimize decontamination/disinfection. Further, the optimal distance between the sprayer nozzle and the surface to be treated may depend on the activator that is employed.

In embodiments, the choice of nozzle type (internally mixed, externally mixed, or hydraulic nozzle) and extent of mixing at or near the nozzle may affect the relative efficacy and efficiency of the decontamination/disinfection oxidizing solution applied to a surface and/or an airspace to be treated.

In embodiments, the timing and duration of the exposure of the oxidizer solution to the UV photons can be varied to optimize oxidizer activation, and/or in decontamination/disinfection. This parameter is particularly important with respect to activation by UV photons. In embodiments, the UV photon light may be provided to the oxidizer solution in a continuous steady state at a fixed wavelength. In embodiments, the UV photon light may be provided to the oxidizer solution in a strobe timing, and/or in an intermittent 'flash' photolysis activation step.

In embodiments, the manipulation of the spray stream properties is used to simultaneously disinfect the airspace between the sprayer nozzle and the surface. As the mixture of the activated droplets travels through the airspace the activated liquid oxidizer (droplets) will interact and destroy any contaminants or pathogens in that airspace. Further, excess gaseous $O_3$ or photon flux is directly effective at destroying many airborne contaminants.

In embodiments, ozone may be added to a spray stream of liquid oxidizer. The spray velocity, extent of mixing, droplet size and proportional quantity of ozone supplied (relative to the liquid oxidizer supplied) are such that only a portion of the ozone is entrained and reactive with the droplets and the surface. The remainder of the gaseous ozone is available to interact with any contaminants in the airspace between the sprayer nozzle and the surface.

Neutralization of Residual Airborne Oxidizers—Air Neutralization Units

The oxidizing mixtures, the activators, and activated oxidizing mixtures disclosed herein are non-toxic at use conditions and safe for the environment. However, airborne oxidizer residuals are hazardous to the user. For example, OSHA sets a 1 ppm STEL for hydrogen peroxide (e.g., HP) in the vapor phase. The use of a sprayer, in particular set for smaller droplet size, is expected to generate quantities of vapor phase HP (and other oxidizers), which may lead to the need for protective safety gear and a significant timeframe before personnel are allowed to re-enter the space.

The methods and systems of the decontamination process described herein may include an air neutralization unit. The air neutralization unit consists of a fan or blower to circulate the atmosphere in the contaminated room through a neutralization component during and after use of the activated decontamination spray. The fan or blower may include a pre-filter coupled to the air-inlet and optionally a post-filter coupled to the air exhaust. The fan or blower may include directional louvers coupled to the air intake and air exhaust that can be adjusted to control the direction of the circulating air flow in the contaminated room space during decontamination treatment. The fan or blower may preferably be sized to exchange one full volume of atmosphere through the neutralization unit at least once per 20 minutes, more preferably be sized to exchange two volumes of atmosphere every 20 minutes, and most preferably be sized to exchange more than three atmosphere volume exchanges every 20 minutes.

During treatment, the atmosphere in the space being decontaminated/disinfected may consist of air, airborne pathogens or other hazardous contaminants, overspray droplets of atomized aqueous peroxygen, and activator mixtures which in some embodiments include aqueous peroxygen disinfectant and excess unreacted gaseous ozone. A portion of the combined atomized ozone and peroxygen spray that is not deposited on the surface remains in the airspace (overspray).

In embodiments, an air neutralization unit may further include a destruct component that decomposes peroxygen and ozone oxidizers contained in the air mixture passing through the neutralization unit. Depending on the volume of the room atmosphere and the capacity of the air neutralization unit, more than one such unit may be incorporated in the system of the invention. Suitable neutralization units may include a packed bed catalyst or catalyst functionalized materials. The catalysts may be based on activated carbon as the removal medium. The catalysts based on activated carbon act very quickly, and do not lead to the formation of hazardous reaction products.

In embodiments, the inclusion of air neutralization units enables the treated space to be cleared of ozone and aqueous peroxygen residuals and returned to normal use rapidly, for economic reasons. In embodiments, destruct systems may be based on catalysts such as manganese oxide or other metal oxides, which may be regenerated by heating to remove moisture. In embodiments, the air neutralization unit may be based on other known methods that that effectively and rapidly decompose peroxygen species and ozone oxidizers. For example, the air neutralization unit may utilize photolysis or photocatalytic decomposition methods, ultrasonic energy, alternating or direct current high voltage energy fields or thermal decomposition in conjunction with other metals including platinum or palladium to substantially decompose and neutralize airborne oxidizer residues.

In embodiments, an air neutralization unit may be used that will efficiently exchange the volume of air in the room. That is, a recirculation system incorporating a blower fan, or any type of air exchange system that will pull air from the airspace and pass it over one or more neutralization components, that destroys or neutralizes any airborne oxidizer residuals, and then blows (e.g., exhausts) the decontaminated air back into the room.

The method of neutralization can be any method that consumes, destroys or decomposes the residual airborne oxidizers. The blower fan, or air exchange unit draws air from the localized airspace into the system where the residuals are destroyed.

In embodiments, the neutralization system (e.g., a neutralization unit) may contain a light source, supplying a wavelength known to decompose the oxidizer components. This light source may include UV photons. The UV photons may decompose the oxidizer components in the oxidizing droplets and/or vapor. For example, HP may be decomposed according to the following:

$$H_2O_2 + h\nu \rightarrow 2 \cdot OH$$

where h$\nu$ is UV light at a wavelength between 200-420 nm at sufficient intensity to completely decompose the HP in the vapor or suspended droplet.

In embodiments, the neutralization system may contain an ion plasma, known to destroy oxidizer components.

In embodiments, the neutralization unit may contain an electric field, set at a potential known to destroy oxidizer components.

In embodiments, the neutralization system (e.g., unit) may contain a high surface-area solid matrix, consisting of materials known to destroy oxidizer components. These materials may contain, but are not limited to, active transition metals like Fe, Cu, Co, Pt or Ag, for example, metal organic frameworks (MOFs), metal doped zeolites or carbon-activated carbon materials. These materials may contain activated carbon or transition-metal doped zeolites. The materials may consist of any material known to substantially decompose or otherwise destroy oxidizers like peroxides, peracids, and persulfates. As the user is spraying the activated oxidizing mixture, the airspace is continuously exchanged through the neutralization component, effectively removing excess airborne oxidizer residuals.

For example, activated carbon (AC) is an environmentally friendly and economical adsorbent that has been widely used in the removal of organic contaminants from wastewater. AC will activate some oxidants, like $H_2O_2$, PS, and PMS, to generate reactive radicals. That is, by generating reactive radicals from $H_2O_2$, PS, and PMS, the $H_2O_2$, PS, and PMS are essentially destroyed by being activated. In the case of surface disinfection, the oxidants (e.g., $H_2O_2$, PS, and/or PMS) are activated (and a portion is destroyed) at or near the surface. In the case of airborne disinfection (e.g., the destruction of airborne residues), they are destroyed by the neutralization component in the neutralization unit so clean air is recirculated back into the airspace. Each of these disinfection/decontamination mechanisms are based on the same chemistry, but one happens in a targeted manner on the contaminated surface, while the other occurs more extensively in a neutralizing blower component. For example, AC or AC doped with Co complexes will decompose persulfate in the following manner:

$$AC+HSO- \rightarrow AC-H+SO\cdot—$$

$$AC—Co^{2+}+HSO— \rightarrow AC-Co^{3+}+SO\cdot-+OH—$$

$$AC—Co^{3+}+HSO- \rightarrow AC-Co^{2+}+SO\cdot—+H+$$

Using the above reactions as an example, the airborne portion of an oxidizing mixture containing persulfate from overspray or suspended droplets are drawn into the air-exchange neutralizer component, that for this example consists of a Co-doped AC material and are subsequently decomposed.

These and other embodiments are discussed below with reference to FIGS. 1-9. However, those skilled in the art will readily appreciate that the detailed description given herein with respect to these figures is for explanatory purposes only and should not be construed as limiting.

FIG. 1 is a system diagram illustrating certain components of a disinfection/decontamination system 100, in accordance with embodiments described herein. In particular, FIG. 1 illustrates a user 105 interacting with a disinfection/decontamination system 100 and a surface 150 showing aspects of a sample embodiment. The disinfection/decontamination system 100 includes a sprayer 125 having a nozzle 130 at a distal end of the sprayer 125, and connecting hoses 120 in liquid communication with a containment apparatus 110 being carried by the user 105. An atomized spray 140 of an activated oxidizing mixture is applied to a surface 150 to be disinfected and decontaminated.

The disinfection/decontamination system 100 may be used to disinfect and decontaminate surfaces and airspaces that have been exposed to biological organisms and/or harmful chemical contaminants. The disinfection/decontamination system 100 may be configured to permit a user 105 to apply the atomized spray 140 to various surfaces that have been contaminated. In embodiments, the atomized spray 140 may be sprayed into an airspace of a room, a vehicle, a gathering place, and so on. Thus, the atomized spray of the activated oxidizing mixture may be applied to both surfaces and an airspace within a given location.

FIG. 2A is a flow chart of an illustrative embodiment of a method for decontaminating a surface 200. The method catalytically boosts the performance of a class of oxidizing biocides for improved antimicrobial performance and shorter contact times resulting in the simultaneous decontamination and disinfection of surface and airborne contaminants.

Method 200 can begin at step 210 where an aqueous-based oxidizer solution is provided. The aqueous-based oxidizer solution includes peroxygen compositions that include hydrogen peroxide as well as other components that contain the peroxide (OOH) moiety. The components of the peroxygen mixture are selected from compositions that are known to form at least one species of sulfate radical, superoxide radical, peroxy radical, acetyl radical, acyloxy radical, methyl radical, or mixtures of these radicals with hydroxyl radicals. The compositions contain at least one peroxygen component in concentrations sufficient to be biocidal for surface decontamination.

At step 220, the aqueous-based oxidizer solution is activated by mixing at least one activator with the peroxygen mixture stream to form a potent, short-lived reactive advanced oxidizer species in a combined atomized spray stream. The oxidizing mixture is activated at or near the surface by introduction of at least one activation catalyst, or activation photon, at or near the nozzle of a sprayer. The oxidizing mixtures can be activated by heterogeneous chemicals (catalysts), homogeneous chemicals (catalysts), by activating photons, or by any combination thereof.

Homogeneous chemical activators (catalysts) may include, but are not limited to aqueous soluble transition-metal complexes, and soluble transition-metal salts. The homogeneous activator may include a liquid solution comprising at least one or more of $Fe^{2+}$, $Mn^{2+}$, $Co^{2+}$, $Ag^{1+}$, $Ce^{2+}$, $Ni^{2+}$, or $V^{3+}$. In embodiments, soluble photocatalysts may also be utilized.

Heterogeneous chemical activators (catalysts) may include, but are not limited to ozone gas ($O_3$), aqueous insoluble transition-metals (small particles), or other insoluble activating materials such as activated carbon.

Ultraviolet light emission activators (e.g., UV photons) may be introduced to the spray stream of the oxidizing mixture. Similarly, photons may be introduced to the surface after the surface is covered with the oxidizing mixture. The photons may be of a specific wavelength or a range of wavelengths that directly activate the oxidizers to form advanced oxidizers. In embodiments, the photons may be of a wavelength that activates a homogeneous or heterogeneous photocatalyst. Further, the UV photon activators may activate the oxidizing mixture as a steady-state exposure, or may be applied in a strobe fashion.

At step 230, the activated aqueous-based oxidizer solution is applied to a surface to be decontaminated. The rate of application of the activated aqueous-based oxidizer solution, as well as the total volume of the activated aqueous-based oxidizer solution may be varied to optimize the efficacy and efficiency of the decontamination/disinfection of the surface. The applied activated aqueous-based oxidizer solution may include unreacted oxidizer solution, as well as entrained and unreacted activator. The mixture of activated aqueous-based oxidizer solution combined with unreacted oxidizer solution and activator (e.g., the mixed solution) will continue to react to form more activated oxidizer. The unreacted oxidizer and activator in the mixed solution will each also decontaminate and disinfect the surface do to the inherent oxidizing strength of the unreacted components.

FIG. 2B is a flow chart of an illustrative an embodiment of activating an aqueous-based oxidizer solution 220. A stream of an aqueous-based oxidizer solution is provided at step 222. The stream of the aqueous-based oxidizer solution is provided to a mixed sprayer nozzle through a connecting hose that connects a source of the aqueous-based oxidizer solution to the mixed nozzle sprayer. A pressure of the stream of the aqueous-based oxidizer solution may be varied by the user to optimize the flow through the mixed nozzle. The oxidizing mixtures may also include other components including surfactants, solvents, builders, pH modifiers, colorants, fragrances and other beneficial components that are application specific.

At step 224, an activator is provided to the process. The activators may be heterogeneous chemicals (catalysts), homogeneous chemicals (catalysts), or activating photons. The activator for a given process may be only one of the types listed above, or may be a combination of one or more of them, and may be selected based on the nature of the contaminate or infectious agent.

Homogeneous chemical activators (catalysts) may include, but are not limited to aqueous soluble transition-metal complexes, and soluble transition-metal salts, for example. Soluble photocatalysts may also be utilized. The homogeneous activator may include a liquid solution comprising at least one or more of $Fe^{2+}$, $Mn^{2+}$, $Co^{2+}$, $Ag^{1+}$, $Ce^{2+}$, $Ni^{2+}$, or $V^{3+}$.

Heterogeneous chemical activators (catalysts) may include, but are not limited to ozone gas ($O_3$), aqueous insoluble transition-metals (small particles), or other insoluble activating materials like activated carbon, for example. Insoluble catalysts such as a liquid suspension containing insoluble suspended materials containing transition metals may also be utilized.

The homogeneous and heterogeneous activators are provided in a liquid phase to the nozzle. The gaseous heterogeneous activators include ozone (e.g., $O_3$). The gaseous $O_3$ may be generated by passing dry air or $O_2$ through an electric powered $O_3$ generator, and is supplied to the tip of the sprayer nozzle via ozone-rated tubing.

Ultraviolet light emission activators (e.g., UV photons) may be introduced to the spray stream of the oxidizing mixture. Similarly, photons may be introduced to the surface after the surface is covered with oxidizing mixture. The photons may be of a specific wavelength or a range of wavelengths that directly activate the oxidizers to form advanced oxidizers. In another embodiment, the photons may be of a wavelength that activates a homogeneous or heterogeneous photocatalyst.

At step 226, the aqueous-based oxidizer solution is mixed with the activator in a sprayer nozzle to form an activated aqueous-based oxidizer solution. The oxidizing mixtures are activated at or near the surface to be decontaminated or disinfected, because the advanced oxidizers are extremely short-lived and therefore require activation on or near the surface. The oxidizing mixtures can be activated by heterogeneous chemicals (catalysts), homogeneous chemicals (catalysts), or by activating photons.

In embodiments, the activation method includes introduction and mixing of the activator (catalyst) component with one or both of the stream or the spray of the oxidizing mixture. Upon mixing, a portion of the oxidizing mixture is substantially immediately reactive with the catalyst forming the activated aqueous-based oxidizer solution in the spray stream. Another portion of the activated aqueous-based oxidizer solution entrains the activating chemical (catalyst) component (in the case of heterogeneous catalysts and homogeneous catalysts) and delivers a portion of the activating chemical (catalyst) to the surface along with the activated oxidizing mixture. Once covering the surface, the activating chemical (catalyst) continues to react and generate advanced oxidizers on the surface to be decontaminated or disinfected.

FIG. 3 illustrates a non-limiting schematic embodiment of a system for decontamination of a surface and of the formation of a short-lived, highly oxidizing mixture. A sprayer 325 is supplied with a stream of an oxidizer solution (e.g., aqueous-based oxidizer solution) 310 though connection hose 317. The sprayer 325 is also supplied with a stream of an activator solution (e.g., a homogeneous or a heterogeneous solution) 324 though connection hose 322, and is joined at the nozzle 330. The activator containing liquid 324 can be introduced into the nozzle 330 using any manner consisting of a conduit to deliver the liquid activator stream and any manner to combine the streams. The liquid catalyst (e.g., activator solution) may be pumped by any suitable type of pump, may be siphoned by a flowing gas, or alternatively may be injected by any suitable type of Venturi-driven injection system. In embodiments, the connection hoses may be packaged together to form a combined connection hoses 320 that may both enter through the sprayer 325.

The oxidizer solution 310 and activator solution 324 mix together at elevated pressures in nozzle 330 to form a mixed solution that includes the short-lived, highly oxidizing solution, as well as unreacted liquid activator and unreacted oxidizing solution. Upon depression of the trigger 327, the mixed solution is sprayed out of the nozzle 330 as an atomized spray 340 mixture of the short-lived, highly reactive activated aqueous-based oxidizer solution 345, the unreacted oxidizer solution 310, and the unreacted activator solution 324.

Activation of the oxidizer solution 310 is initiated in the nozzle 330 where the oxidizer solution stream 310 and the activator solution stream 324 collide and the mixing begins. The activation of the oxidizers 310 continues as the mixed solution flows away from the nozzle and toward the surface 350 to be treated, and in the surrounding airspace. Thus, the surface 350 being treated and the airspace around the nozzle are exposed to the short-lived, highly oxidizing solution 345, as well as the unreacted activator solution 324 and the unreacted oxidizing solution 310.

In embodiments, the activator is gaseous, such as ozone (e.g., $O_3$) generated in flowing dry air or $O_2$. The $O_3$ is mixed with the oxidizer solution in a mixing sprayer (e.g., mixing pneumatic sprayer.) These mixing pneumatic sprayers may have nozzles that mix the gaseous activator with the aqueous-based activator solution inside of the nozzle (an internal mixing pneumatic sprayer) just upstream of the constriction in the nozzle, or nozzles that mix the gaseous activator with the aqueous-based activator solution outside of the nozzle (an external mixing pneumatic sprayer) just downstream of the constriction in the nozzle.

FIG. 4A illustrates an embodiment of the configuration of a nozzle 410 of an internal mixing pneumatic sprayer. The nozzle 410 includes a liquid inlet 415 through which the aqueous-based oxidizer solution liquid stream 417 is fed into the nozzle 410. The nozzle 410 also includes gas inlets 420 through which the activator gas 422 is fed into the nozzle 410. The aqueous-based oxidizer solution liquid stream 417 mixes with the activator gas 422 in the mixing chamber 425. The activated aqueous-based oxidizer solution 445 is formed in the mixed solution after mixing of the aqueous-based oxidizer solution 417 with the activator gas 422 in the mixing chamber 425. The mixed solution is sprayed out of the nozzle as an atomized spray 440 containing the activated aqueous-based oxidizer solution 445, the unreacted aqueous-based oxidizer solution 417, and the activator gas 422. The components of the mixed solution continue to react with each other, and with contaminates and infectious agents in the airspace and on the surface to be treated.

FIG. 4B illustrates an embodiment of the configuration a nozzle 460 of an external mixing pneumatic sprayer. The nozzle 460 includes a liquid inlet 465 through which the aqueous-based oxidizer solution liquid stream 467 is fed into the nozzle 460. The nozzle 460 also includes gas inlets 470 through which the activator gas 472 is fed into the nozzle 460. The aqueous-based oxidizer solution liquid stream 467 mixes with the activator gas 472 external to the nozzle 460, at the point where the activator gas 472 collides with the aqueous-based oxidizer solution liquid stream 467. The activated aqueous-based oxidizer solution 445 is formed in the mixed solution 475, which includes oxidizer solution liquid stream 467 after mixing with the activator gas 472 outside of the nozzle 460. The mixed solution 475 is sprayed from the nozzle 460 in an air atomized spray 490. The components of the mixed solution continue to react with each other, and with contaminates and infectious agents in the airspace and on the surface to be treated.

FIG. 5 illustrates an embodiment of a hydraulic sprayer 525. The hydraulic sprayer may also be known as a Venturi-type sprayer. The hydraulic sprayer 525 (e.g., Venturi-type sprayer) has a first connecting hose 517 providing aqueous-based oxidizer solution to the sprayer 525 through handle 526. The aqueous-based oxidizer solution passes through the oxidizer solution inlet (not shown) in handle 526 to a nozzle 530. A liquid activator mixture is provided to the nozzle 530 through activator inlet 535. The liquid activator mixture is provided to the activator inlet 535 through hose 522. The aqueous-based oxidizer solution and the liquid activator mix in the nozzle 530 to form the activated the aqueous-based oxidizer solution.

FIG. 6A illustrates an embodiment of a pneumatic sprayer 625 with an attached UV photon source 650. The pneumatic sprayer 625 has a trigger 627 that a user may use to start and stop the flow of the activator and the aqueous-based oxidizer solution to the nozzle 630. In embodiments, the aqueous-based oxidizer solution is provided to the sprayer 625 through connecting hoses 620 that are in liquid communication with the aqueous-based oxidizer solution inlet (not shown) within the handle 626. An atomized spray 640 is provided through the nozzle 630 and is irradiated by ultraviolet light emission activators (e.g., UV photons) 660. In embodiments, the UV photons 660 are provided at a wavelength between 200-420 nm and at sufficient intensity to completely decompose the oxidizer compounds in an atomized spray, a vapor, or a suspended droplet. In embodiments, the UV photons are directed at the air atomized spray 640 while the solution is being sprayed, or upon arrival at a surface to be treated, or a combination of both.

FIG. 6B illustrates a projection of a UV light source 650, for example from the UV photon source 650 or a separate photon source, on a surface on which a solution containing oxidizer solution 610 and activator solution 624 has been deposited. The circular region 640 contains unreacted oxidizer solution 610, unreacted activator 624, and circular region 660. The circular region 660, within region 640, is irradiated with UV photons and results in the formation of activated aqueous-based oxidizer solution 645. The mixed solution within region 660 contains the activated aqueous-based oxidizer solution 645, the unreacted oxidizer solution 610, and the unreacted activator solution 624. That is, the UV photons activate the reactions that produce the activated oxidizer solution 645 on the surface to be treated.

Figure 7B:
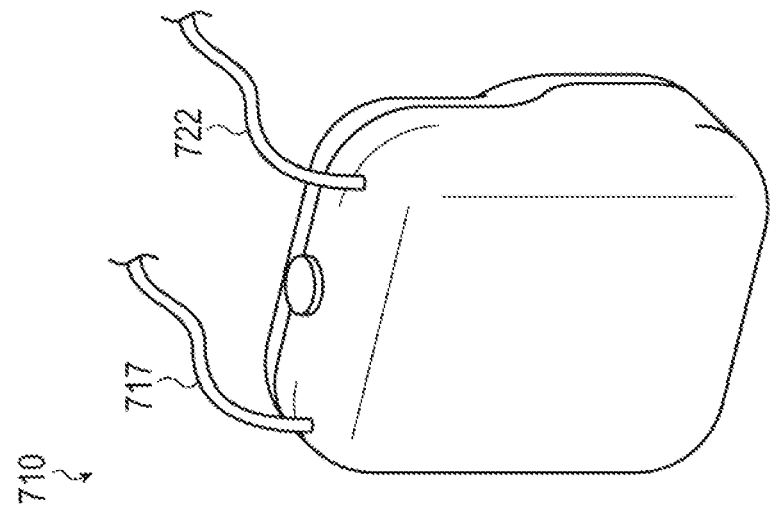
FIG. 7B illustrates a containment apparatus of portable decontamination system.
Figure 7A:
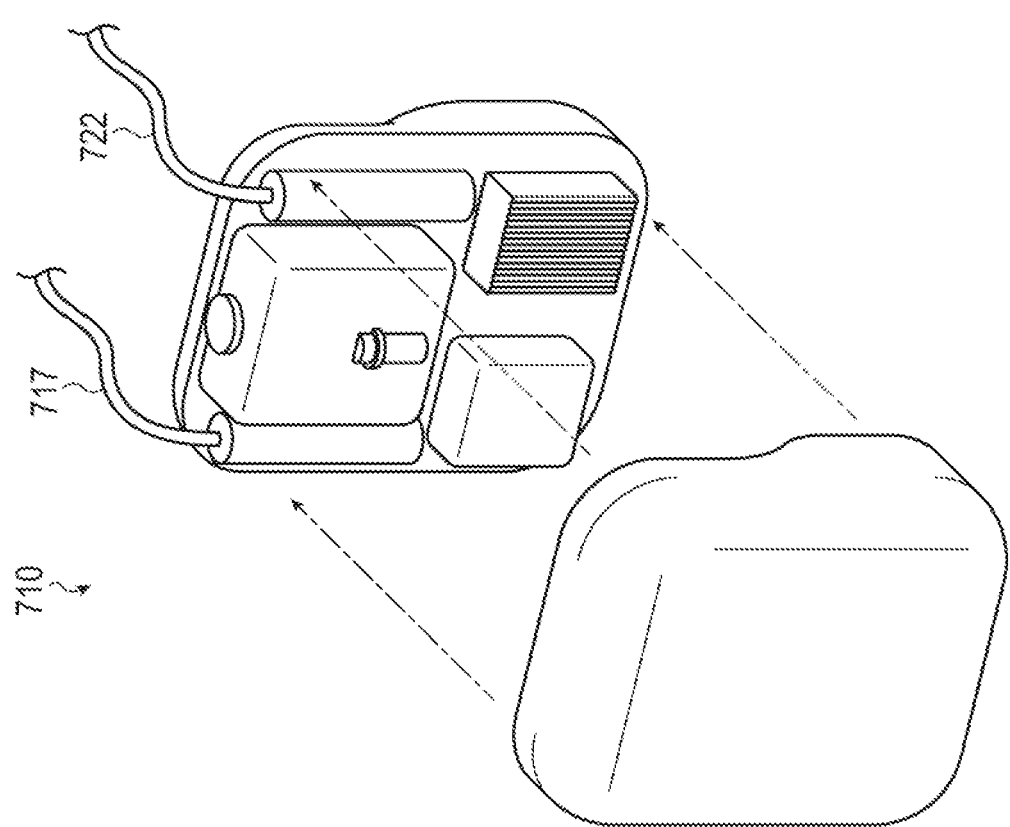
FIG. 7A illustrates a containment apparatus of portable decontamination system.

FIGS. 7A and 7B illustrate non-limiting embodiments of a containment apparatus 710 of portable decontamination system. FIG. 7A illustrates a non-limiting example of a containment apparatus with a portion of a cover removed. In embodiments, the containment apparatus 710 may have one or more supplies of gaseous activator (and/or an ozone generator), tanks of liquid activator, oxidizer solution, water, alternative solvents, surfactants, and so on. In embodiments, an oxidizer solution may be transported to the sprayer by hose 717, while an activator solution and/or activator gas may be transported to the sprayer by hose 722. FIG. 7B illustrates a non-limiting example of a containment apparatus with a cover in position. Hoses 717 and 722 may pass through the containment apparatus cover.

In embodiments, the containment apparatus 710 may be carried by a user, or may be carried on a cart or dolly.

In embodiments, the gaseous activator may be generated by passing dry air (or room air) through an electrical discharge to form the $O_3$ in the stream of dry air.

Figure 8:
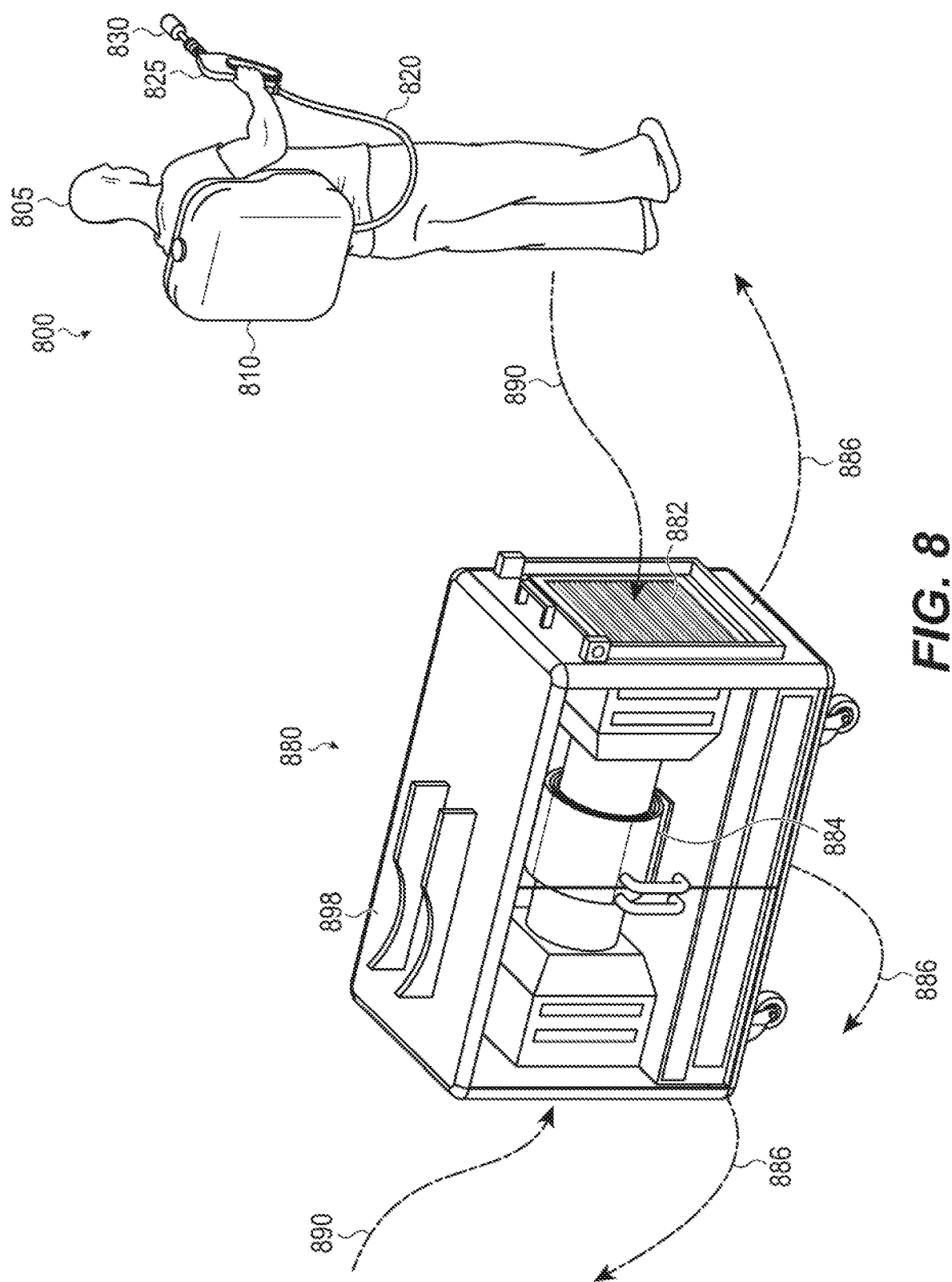
FIG. 8 illustrates a portable decontamination system with an air neutralization unit.

FIG. 8 illustrates a non-limiting embodiment of a portable decontamination system 800 with an air neutralization unit 880. The portable decontamination system 800 includes a containment apparatus 810 being carried by a user 805 with a sprayer 825 in liquid communication with the containment apparatus 810 via connection hoses 820. The portable decontamination system 800 allows the user to move about freely and apply the activated air atomized aqueous-based oxidizer solution to surfaces through nozzle 830, as well as spray the solution in the air to disinfect and decontaminate both surfaces and airspace in a location that have been exposed to biological organisms and/or harmful chemical contaminants.

FIG. 8 also illustrates an embodiment of an air neutralization unit 880. In embodiments, the air neutralization unit 880 may circulate the atmosphere in the contaminated room through a neutralization component during and after use of the activated decontamination spray. The air neutralization unit 880 contains a fan 884 (e.g., blower) coupled to air-inlets 882 that pulls contaminated air 890 into the neutralization unit 880, filters the air through air neutralization components, and then expels the decontaminated air through air exhausts 886 on the bottom of the neutralization unit 880. In embodiments, the neutralization unit 880 may include a mounting rack 898 to secure a container apparatus.

Figure 9:
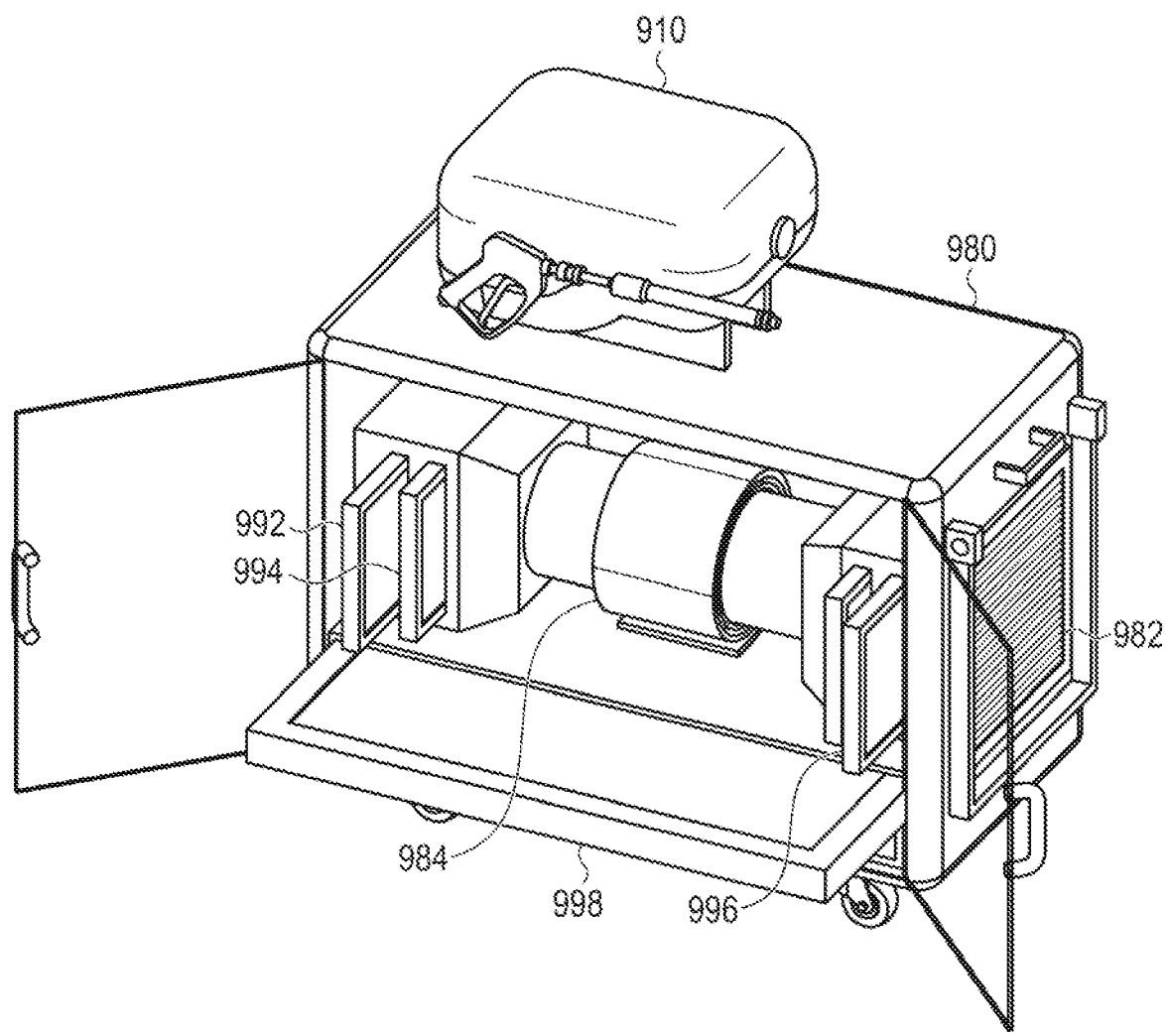
FIG. 9 illustrates an air neutralization unit.

FIG. 9 illustrates an embodiment of an air neutralization unit 980. In embodiments, the air neutralization unit 980 consists of a fan 984 (e.g., blower) to circulate the atmosphere in the contaminated room through a neutralization component during and after use of the activated decontamination spray (e.g., activated aqueous-based oxidizer solution). The fan may include pre-filters 996, 994, and 992 coupled to the air intake 982 and optionally a post-filter 998 coupled to the air exhaust. The fan 984 may include directional louvers (not shown) coupled to the air intake 982 and air exhaust that can be adjusted to control the direction of the circulating air flow in the contaminated room space during decontamination treatment. The fan 984 is preferably sized to exchange one full volume of atmosphere through the neutralization unit at least once per 20 minutes, more preferably two volumes of atmosphere every 20 minutes, and most preferably more than 3 atmosphere volume exchanges every 20 minutes. The neutralization unit 980 is shown with a containment apparatus 910 positioned on a mounting rack.

EXAMPLES

The following examples are intended to further illustrate the disclosure and its preferred embodiments. They are not intended to limit the disclosure in any manner.

Example 1

Ozone was produced using a commercial corona discharge tube supplied with dry air. The produced ozone stream was introduced into an aqueous mixture of peroxyacetic acid (PAA) containing 2500 mg/L PAA and 9800 mg/L hydrogen peroxide. Various sprayer configurations were evaluated, and the resulting parameters are listed in Table 1.

TABLE 1

| Nozzle | Orifice (mm) | Gas Pressure (psi) | Gas Flowrate (lpm) | Liquid Flowrate (lpm) Peroxygen Delivery Rate [mmol/min] | [ozone] (mg/L) Ozone Delivery Rate [mmol/min] | $ROOH_{(aq)}:O_{3(g)}$ (mEq oxidizer) |
|---|---|---|---|---|---|---|
| Round Internal Mix full cone | 1.0 | 15-20 | 15-25 | 0.06-0.15 [22-56] | 5 [1.6-2.6] | 14:1-21:1 |
| Round Internal Mix full cone | 1.5 | 15-20 | 20-30 | 0.10-0.20 [37-75] | 5 [2.1-3.1] | 18:1-24:1 |
| Fuel Burner Siphon nozzle | 0.5 | 25-45 | 9-19 | 0.129 [48] | 5 [0.9-2] | 51:1-24:1 |
| Fuel Burner Siphon nozzle | 1.0 | 25-45 | 15-30 | 0.166 [62] | 5 [1.6-3.1] | 40:1-20:1 |
| Fuel Burner Siphon nozzle | 1.5 | 25-45 | 33-69 | 0.237 | 5 [3.4-7.2] | 25.7-12:1 |

Example 2

Ozone was produced using a commercial corona discharge tube supplied with dry air. The produced ozone stream was introduced into an aqueous mixture of freshly prepared non-equilibrium peroxyacetic acid containing 2950 mg/L PAA and 1800 mg/L hydrogen peroxide. Various sprayer configurations were evaluated, and the resulting parameters are listed in Table 1.

TABLE 2

| Nozzle | Orifice (mm) | Gas Pressure (psi) | Gas Flowrate (lpm) | Liquid Flowrate (lpm) Peroxygen Delivery Rate [mmol/min] | [ozone] (mg/L) Ozone Delivery Rate [mmol/min] | $ROOH_{(aq)}:O_{3(g)}$ (mEq oxidizer) |
|---|---|---|---|---|---|---|
| Round Internal Mix full cone | 1.0 | 15-20 | 15-25 | 0.06-0.15 [8.6-22] | 5 [1.6-2.6] | 5:1-8:1 |
| Round Internal Mix full cone | 1.5 | 15-20 | 20-30 | 0.10-0.20 [14-29] | 5 [2.1-3.1] | 7:1-9:1 |
| Fuel Burner Siphon nozzle | 0.5 | 25-45 | 9-19 | 0.129 [18] | 5 [0.9-2.0] | 20:1-9:1 |
| Fuel Burner Siphon nozzle | 1.0 | 25-45 | 15-30 | 0.166 [29] | 5 [1.6-3.1] | 15:1-8:1 |
| Fuel Burner Siphon nozzle | 1.5 | 25-45 | 33-69 | 0.237 [34] | 5 [3.4-7.2] | 10:1-5:1 |

Example 3

Ozone was produced using a commercial corona discharge tube supplied with 5 lpm dry air. The produced ozone stream was introduced into a hydraulically atomized aqueous mixture of peroxyacetic acid containing 2500 mg/L PAA and 9800 mg/L hydrogen peroxide. Various hydraulic atomization nozzles were evaluated, and the resulting parameters are listed in Table 3.

TABLE 3

| Nozzle | Orifice (mm) | Liquid Pressure (psi) | Liquid Flowrate (lpm) Peroxygen Delivery Rate [mmol/min] | [ozone] (mg/L) Ozone Delivery Rate [mmol/min] | $ROOH_{(aq)}:O_{3(g)}$ (mEq oxidizer) |
|---|---|---|---|---|---|
| Full cone | 0.4 | 90 | 0.06-0.08 [22-30] | 5 [0.52] | 43:1-57:1 |
| Full cone | 0.5 | 120 | 0.10-0.13 [37-48] | 5 [0.52] | 71:1-93:1 |
| Full cone | 0.6 | 120 | 0.16-0.20 [60-75] | 5 [0.52] | 114:1-143:1 |
| Full cone | 0.7 | 110 | 0.25-0.30 [93-112] | 5 [0.52] | 179:1-215:1 |
| Full cone | 0.8 | 105 | 0.41-0.50 [153-186] | 5 [0.52] | 293:1-358:1 |

Example 4

Ozone was produced using a commercial corona discharge tube supplied with dry oxygen (89%) at a 3 lpm flowrate. The produced ozone stream was introduced into a hydraulically atomized aqueous mixture of peroxyacetic acid containing 2500 mg/L PAA and 9800 mg/L hydrogen peroxide.

TABLE 4

| Nozzle | Orifice (mm) | Liquid Pressure (psi) | Liquid Flowrate (lpm) Peroxygen Delivery Rate [mmol/min] | [ozone] (mg/L) Ozone Delivery Rate [mmol/min] | $ROOH_{(aq)}:O_{3(g)}$ (mEq oxidizer) |
|---|---|---|---|---|---|
| Full cone | 0.4 | 90 | 0.06-0.08 [22-30] | 50 [3.1] | 7:1-10:1 |
| Full cone | 0.5 | 120 | 0.10-0.13 [37-48] | 50 [3.1] | 12:1-16:1 |
| Full cone | 0.6 | 120 | 0.16-0.20 [60-75] | 50 [3.1] | 19:1-24:1 |
| Full cone | 0.7 | 110 | 0.25-0.30 [93-112] | 50 [3.1] | 30:1-36:1 |

Example 5

Ozone was produced using a commercial corona discharge tube supplied with dry oxygen (93%) at a 1 lpm flowrate. The produced ozone stream was introduced into an aqueous mixture of peroxyacetic acid containing 2500 mg/L PAA and 9800 mg/L hydrogen peroxide.

TABLE 5

| Nozzle | Orifice (mm) | Liquid Pressure (psi) | Liquid Flowrate (Ipm) Peroxygen Delivery Rate [mmol/min] | [ozone] (mg/L) Ozone Delivery Rate [mmol/min] | $ROOH_{(aq)}:O_{3(g)}$ (mEq oxidizer) |
|---|---|---|---|---|---|
| Full cone | 0.4 | 90 | 0.06-0.08<br>22-30 mmol/min | 70<br>4.4 mmol/min | 15:1-30:1 |
| Full cone | 0.5 | 120 | 0.10-0.13<br>37-48 mmol/min | 70<br>4.4 mmol/min | 26:1-33:1 |
| Full cone | 0.6 | 120 | 0.16-0.20<br>60-75 mmol/min | 70<br>4.4 mmol/min | 41:1-51:1 |
| Full cone | 0.7 | 110 | 0.25-0.30<br>93-112 mmol/min | 70<br>4.4 mmol/min | 64:1-77:1 |

Example 6

Ozone was produced using a commercial corona discharge tube supplied with dry air. The produced ozone stream was introduced into an aqueous stream. The combined air atomized spray stream was directed onto a shallow pan containing a thin layer of aqueous KI indicator for a controlled time (120 sec). The quantity of oxidizer that was delivered to the pan during the experiment was quantified using iodometric titration method. The quantity of oxidizer delivered to the surface for an externally mixed sprayer configuration was compared to the quantity delivered by a similarly sized, as determined by liquid flowrate and spray properties, internally mixed nozzle. The quantity delivered by both sprayer configurations were compared to a control to account for the quantity of ozone delivered in the gas phase alone (non-mixed). The observed ozone concentration was calculated from the quantity of ozone delivered in the mixed phase minus the quantity delivered in the control in the total volume of aqueous spray delivered. For both sprayer configurations, the effect of modifying the aqueous mixture with non-ionic surfactant was also evaluated.

These results indicate that for a similar produced spray pattern, the internally mixed nozzle requires less air flow for suitable atomization. The quantity and concentration of ozone delivered to a surface is improved using an internally mixed air atomization nozzle. The modification of the aqueous mixture with surfactant mixtures also improves quantity and observed concentration of ozone delivered to the surface.

TABLE 6

| | Air flowrate (Ipm) | Liquid flowrate (Ipm) | Observed $[O_3]$ (mg/L) | Ozone Delivery efficiency (%) |
|---|---|---|---|---|
| Externally Mixed air-atomization nozzle | | | | |
| Ozone control | 25 | — | — | |
| $O_3$ + citric acid (0.1% wt. aq) | 25 | 0.075 | 3.9 | 0.2% |
| $O_3$ + citric acid (0.1% wt. aq) and 0.5% wt. non-ionic surfactant (alkyl glucosides) | 25 | 0.075 | 8.1 | 0.5% |
| $O_3$ + citric acid (0.1% wt. aq) and 1.0% wt. non-ionic surfactant mixture (alkyl glucoside and Tween 80) | 25 | 0.075 | 25.7 | 1.5% |
| Internally Mixed air-atomization nozzle | | | | |
| Ozone control | 14 | — | — | |
| $O_3$ + citric acid (0.1% wt. aq) | 14 | 0.05 | 20.8 | 1.5% |
| $O_3$ + citric acid (0.1% wt. aq) and 0.5% wt. non-ionic surfactant (Tween 80) | 14 | 0.05 | 36.7 | 2.6% |
| $O_3$ + citric acid (0.1% wt. aq) and 1.0% wt. non-ionic surfactant mixture | 14 | 0.05 | 49.2 | 3.5% |
| Hydraulic atomization nozzle (0.6mm orifice) | | | | |
| $O_3$ + citric acid and 0.5% wt. non-ionic surfactant (alkyl glucosides) | 2 | 0.11 | 1.59 | 5.1% |

These results show that while the externally mixed sprayer configuration actually supplies a larger quantity of ozone, due to the higher gas flowrates needed to properly atomize the spray, surprisingly more observed ozone is deposited onto the test surface in the case of the internally atomized configuration, i.e. an increased observed concentration of ozone based on the volume of atomized combined spray stream deposited on the surface. These results also confirm that modification of the physical properties of the aqueous mixture with mixtures of at least surfactant produces a significant enhancement to interaction between the aqueous phase and the gas phase ozone.

The test utilizing a hydraulically atomized spray resulted in higher ozone delivery efficiency to the test-surface, but there is much less quantity of ozone produced. The observed effective ozone concentration delivered to the test-surface was around 5-30 times lower than similar air-atomized experiments.

Example 7

A non-equilibrium mixture of peracetic acid was prepared by reaction of alkaline hydrogen peroxide with glycerol triacetate. The pH of the generated mixture was adjusted to 6.02 with citric acid. The initial composition of the non-equilibrium peracetic acid mixture was measure by titration with cerium (IV) sulfate to determine hydrogen peroxide concentration followed by iodometric titration with sodium thiosulfate solution to determine peracetic acid concentration. This mixture was sprayed using internally mixed- and externally mixed air atomization spray configurations as described in Example 6. The air used to atomize the sprays was passed through a desiccant column and a commercial corona discharge tube configured to generate 5 mg/L ozone in the dry air stream. The combined atomized spray stream was collected in a glass beaker and the samples were characterized after spraying. The two step titration will determine the hydrogen peroxide concentration in the first step and the combined peracetic/ozone in the second step. Concentrations of the combined peracetic acid/ozone titration are reported as ppm peracetic acid.

TABLE 7

|  | Hydrogen peroxide (ppm) | Peracetic acid (ppm) | Combined PAA + $O_3$ (ppm) | $ROOH_{(aq)}:O_{3(g)}$ (mEq oxidizer) |
|---|---|---|---|---|
| Peracetic acid mixture (initial) | 500 | 1600 | | |
| External Mix spray configuration post-spray sample | 500 | — | 1790 | 1.4:1 |
| Internal Mix spray configuration post-spray sample | 500 | — | 1690 | 1.5:1 |

Example 8

A hydraulic atomization sprayer configuration was tested with a freshly prepared non-equilibrium peracetic acid mixture against MS2 Bacteriophage (a common surrogate for RNA viruses). Using ATCC 15597-B1 test method, the efficacy of a hydraulically atomized spray (0.8 mm orifice) was compared for the spray with and without introduction of ozone, and also compared to a control treated only with phosphate buffered saline solution (PBS). The MS2 Bacteriophage stock mixture was dried onto a stainless steel carrier under an organic load (5% wt. bovine serum albumin). The initial microbial load was $9.6 \times 10^6$ plaque forming units (PFU)/carrier. Carriers were sprayed with non-equilibrium peracetic acid mixture with and without ozone addition into the atomized spray stream.

Figure 10:
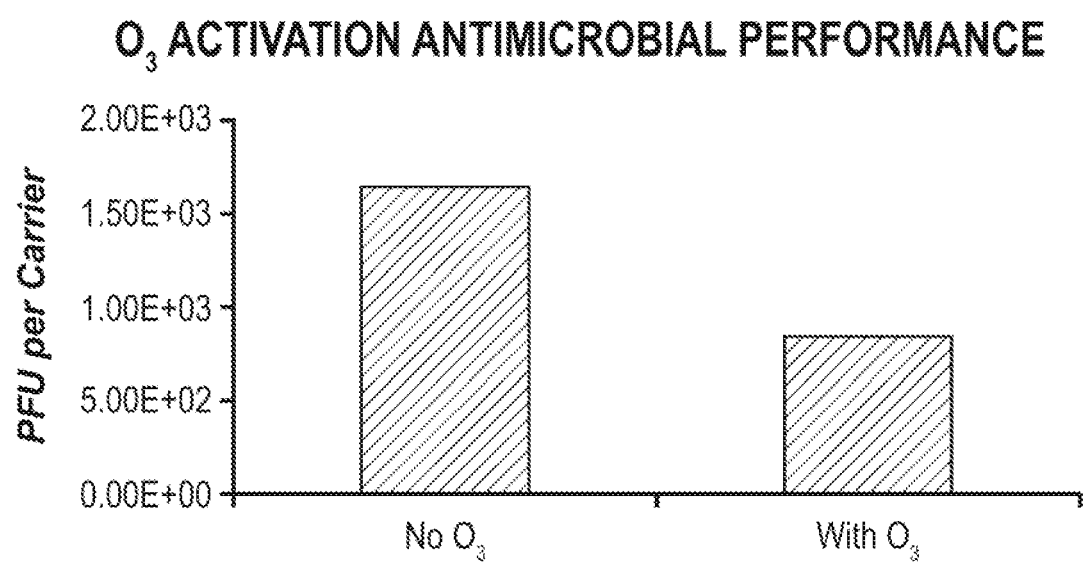
FIG. 10 is a graph showing efficacy of a hydraulically atomized spray with and without ozone.

The non-equilibrium peracetic acid mixture consisted of 4000 ppm peracetic acid and 2500 ppm hydrogen peroxide at a pH 6. In each case the test carriers were quenched at a contact time of 3 minutes. FIG. 10 is a graph showing efficacy of a hydraulically atomized spray with and without introduction of ozone; results indicated 40% less viable microbes remained when treated with the peracetic acid/ozone combined spray compared to the peracetic acid spray alone. In this experiment the ratio of peroxygen to ozone (ROOH(aq): $O_3$(g) (mEq oxidizer)) was 1:140 mEq oxidizer.

Example 9

A prototype sprayer configured with a neutralization unit was evaluated during surface spraying. A hydraulic atomization sprayer configured with an ozone gas syphoning nozzle was used to spray and deposit an aqueous mixture onto a vertical non-porous surface. An adjustable blower/vacuum (525 max CFM) with a 6" diameter intake pipe was integrated into the sprayer handle and maintained 12-24" from the surface during spraying. The blower exhaust was fitted with activated carbon impregnated filter media. The high surface area, porous, coconut shell derived activated carbon was supported on 3/16" thick nominal porous polyester support material (3.2 oz. polyester/sq yd media weight). The velocity of air flow was measured 2" off the surface (10" from the blower intake pipe) using a handheld anemometer. The hydraulic sprayer was configured to produce a 60 micron atomized spray (0.11 lpm aqueous flow and 2.0 lpm ozone gas mixture). The integrated sprayer/neutralizer with activated carbon filter produced an airflow velocity of 0.1-1.7 mph 2" near the surface depending on the blower set point and the sprayer distance from the surface. The observed overspray was effectively captured and removed during spraying and did not negatively affect the deposition of aqueous mixture onto the surface. The measured velocity diminished sharply at distances over 24". The presence of excess unreacted ozone, noted by its characteristic odor, was virtually eliminated.

The foregoing description, including the examples above, are non-limiting, and for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. A method for decontaminating a surface, the method comprising:
    providing an aqueous-based oxidizer solution;
    activating the aqueous-based oxidizer solution with an activator comprising at least one of a catalyst or UV photons near the surface to be decontaminated, wherein the activated aqueous-based oxidizer solution comprises a peroxyacid mixture comprising at least one of a persulfate, a peroxycarboxylic acid, or a hydrogen peroxide and the activator includes a stream of ozone containing gas and a ratio of a volume of ozone-containing gas to a volume of the peroxyacid mixture is between 500:1 and 0.1:1; and applying the activated aqueous-based oxidizer solution to the surface to be decontaminated.

2. The method of claim 1, wherein:
the activating comprises:
providing a stream of the aqueous-based oxidizer solution;
providing the activator comprising the stream of the ozone containing gas,
wherein the stream of ozone containing gas mixes with the stream of the aqueous-based oxidizer solution in an air atomized mixed sprayer nozzle to form an activated aqueous-based oxidizer solution; and
the applying comprises spraying the activated aqueous-based oxidizer solution on the surface to be decontaminated with the air atomized mixed sprayer nozzle.

3. The method of claim 2, wherein:
the activated aqueous-based oxidizer solution comprises a peroxyacid mixture comprising at least one of a persulfate, a peroxycarboxylic acid, or a hydrogen peroxide;
a concentration of the peroxyacid mixture in the activated aqueous-based oxidizer solution atomized spray is between 0.001 and 2 weight percent; and
a ratio of the peroxyacid mixture to ozone molar equivalents is less than 250:1 in the activated aqueous-based oxidizer solution atomized spray.

4. The method of claim 3, wherein a droplet size of the activated aqueous-based oxidizer solution atomized spray is between 20-150 microns.

5. The method of claim 2, wherein the air atomized mixed sprayer nozzle comprises a siphoning air atomized mixed sprayer nozzle.

6. The method of claim 2, wherein the stream of ozone containing gas is produced by flowing dry air or oxygen through a corona discharge tube or between one or more corona discharge plates.

7. The method of claim 1, wherein:
the aqueous-based oxidizer solution comprises a peroxycarboxylic acid mixture; and
the activating comprises:
providing an atomized spray of the peroxycarboxylic acid mixture;
providing a flux of UV photons at a wavelength between 200-420 nm and at sufficient intensity to completely decompose the peroxycarboxylic acid mixture;
wherein the atomized spray of the peroxycarboxylic acid mixture is irradiated with the flux of UV photons to form an activated peroxycarboxylic acid mixture.

8. The method of claim 1, wherein the activator comprises:
a liquid solution comprising at least one or more of $Fe^{2+}$, $Mn^{2+}$, $Co^{2+}$, $Ag^{1+}$, $Ce^{2+}$, $Ni^{2+}$, or $V^{3+}$; or
a liquid suspension containing insoluble suspended materials containing transition metals.

9. A method for decontaminating a surface, the method comprising:
forming a peroxyacid-based biocide, the peroxyacid-based biocide comprising:
an aqueous peroxyacid mixture stream comprising at least one component of a persulfate, a peroxycarboxylic acid, or a hydrogen peroxide; and
a peroxyacid activator component;
wherein the peroxyacid-based biocide is formed by mixing the aqueous peroxyacid mixture stream with the peroxyacid activator component in a sprayer nozzle; and
applying a stream of the peroxyacid-based biocide to the surface to be decontaminated with the sprayer nozzle.

10. The method of claim 9, wherein the peroxyacid activator component comprises:
a liquid mixture of at least one soluble transition metal ion, comprising at least one of $Fe^{2+}$, $Mn^{2+}$, $Co^{2+}$, $Ag^{1+}$, $Ce^{2+}$, $Ni^{2+}$, or $V^{3+}$; or
a liquid suspension comprising at least one insoluble suspended material containing one or more transition metals.

11. The method of claim 10, wherein a stoichiometric molar ratio of the aqueous peroxyacid mixture to the peroxyacid activator component in the peroxyacid-based biocide stream is less than 250:1.

12. The method of claim 9, wherein:
the sprayer nozzle is an air atomization sprayer nozzle;
each of the peroxyacid activator component and the aqueous peroxyacid mixture stream are provided simultaneously by corresponding liquid pumps to the air atomization sprayer nozzle to form the peroxyacid-based biocide;
a supplied gas stream atomizes the peroxyacid-based biocide for applying an atomized peroxyacid-based biocide stream to the surface to be decontaminated; and
a droplet size of the atomized peroxyacid-based biocide stream is between 20-150 microns.

13. The method of claim 12, wherein the atomized peroxyacid-based biocide stream generates a mixture of reactive oxygen species in:
the atomized peroxyacid-based biocide stream; and
the atomized peroxyacid-based biocide stream that is applied to the surface to be decontaminated.

14. The method of claim 10, wherein:
the sprayer nozzle is a hydraulic atomization sprayer nozzle;
the aqueous peroxyacid mixture stream and the liquid mixture of the peroxyacid activator component are each supplied to the hydraulic atomization sprayer nozzle by corresponding liquid pumps;
the stream of the peroxyacid-based biocide is atomized into an atomized peroxyacid-based biocide spray stream; and
the atomized peroxyacid-based biocide spray stream comprises a mixture of reactive oxygen species.

15. The method of claim 9, wherein the method further comprises:
neutralizing airborne contaminants and residual airborne atomized peroxyacid-based biocide with an air neutralization unit, the air neutralization unit comprising:
a blower to circulate an air mixture in a space to be decontaminated; and
a destruct component that decomposes the airborne contaminants and the residual airborne atomized peroxyacid-based biocide contained in the air mixture passing through the air neutralization unit.

16. The method of claim 15, wherein the destruct component comprises at least one of: packed bed catalysts; catalyst functionalized materials;
decomposition methods based on at least one of photolysis, photocatalysis, ultrasonic energy;
alternating or direct current high voltage energy fields; or thermal decomposition in conjunction with metal catalysts to substantially decompose airborne oxidizer residues, the metal catalysts comprise at least one of platinum or palladium.

* * * * *